(12) United States Patent
van den Berg et al.

(10) Patent No.: US 12,499,379 B2
(45) Date of Patent: Dec. 16, 2025

(54) READOUT-ERROR MITIGATION FOR QUANTUM EXPECTATION

(71) Applicant: International Business Machines Corporation, Armonk, NY (US)

(72) Inventors: Ewout van den Berg, Bronxville, NY (US); Zlatko Kristev Minev, White Plains, NY (US); Paul Kristan Temme, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1197 days.

(21) Appl. No.: 17/123,876

(22) Filed: Dec. 16, 2020

(65) Prior Publication Data

US 2022/0188682 A1   Jun. 16, 2022

(51) Int. Cl.
   *G06N 10/00*   (2022.01)
   *G06N 10/20*   (2022.01)

(52) U.S. Cl.
   CPC ............ *G06N 10/00* (2019.01); *G06N 10/20* (2022.01)

(58) Field of Classification Search
   CPC ................................ G06N 10/00; G06N 10/20
   See application file for complete search history.

(56) References Cited

U.S. PATENT DOCUMENTS

| | | |
|---|---|---|
| 8,089,286 B2 | 1/2012 | Silva et al. |
| 10,360,088 B2 | 7/2019 | Wallman et al. |

(Continued)

FOREIGN PATENT DOCUMENTS

| | | |
|---|---|---|
| AU | 2021399066 A1 | 5/2023 |
| CN | 111637896 A | 9/2020 |

(Continued)

OTHER PUBLICATIONS

Berg et al., "Model-free readout-error mitigation for quantum expectation values", IBM Quantum, T.J. Watson Research Center, Dec. 9, 2020, pp. 1-9.

(Continued)

*Primary Examiner* — Marshall L Werner
(74) *Attorney, Agent, or Firm* — Amin, Turocy & Watson, LLP

(57) ABSTRACT

Techniques for mitigating readout error for quantum expectation are presented. Calibration component applies first random Pauli gates to qubits at first output of first circuit prior to first readout measurements of the qubits. Estimation component applies second random Pauli gates to qubits at second output of second circuit prior to second readout measurements of the qubits, and generates an error-mitigated readout determination based on first random Pauli gates applied to qubits at first circuit output and second random Pauli gates applied to qubits at second circuit output. Calibration component determines calibration data based on first readout measurements. Estimation component determines estimation data based on second readout measurements. Estimation component determines normalization scalar value based on the calibration data, determines estimation scalar value based on the estimation data, and determines the error-mitigated readout determination associated with a circuit of interest based on the normalization scalar value and estimation scalar value.

25 Claims, 10 Drawing Sheets

(56) References Cited

U.S. PATENT DOCUMENTS

| | | | | |
|---|---|---|---|---|
| 2009/0259905 | A1* | 10/2009 | Silva | B82Y 10/00 977/933 |
| 2017/0308803 | A1 | 10/2017 | Wallman et al. | |
| 2018/0314969 | A1 | 11/2018 | Thornton et al. | |
| 2019/0026211 | A1 | 1/2019 | Wallman et al. | |
| 2019/0095811 | A1 | 3/2019 | Antonio et al. | |
| 2019/0164034 | A1 | 5/2019 | Gambetta et al. | |
| 2020/0097848 | A1 | 3/2020 | Woerner et al. | |
| 2023/0196173 | A1* | 6/2023 | Cai | G06N 10/70 714/37 |
| 2023/0196174 | A1* | 6/2023 | Cai | G06F 11/079 714/37 |

FOREIGN PATENT DOCUMENTS

| | | |
|---|---|---|
| CN | 116529738 A | 8/2023 |
| EP | 4264507 A1 | 10/2023 |
| JP | 2024-500220 A | 1/2024 |
| WO | 2022/129204 A1 | 6/2022 |

OTHER PUBLICATIONS

Berg et al., "Model-free readout-error mitigation for quantum expectation values", IBM Quantum, T.J. Watson Research Center, Dec. 10, 2020, pp. 1-9.

Berg et al., "Model-free readout-error mitigation for quantum expectation values", Nov. 23, 2020, pp. 1-8.

Berg et al., "Model-free readout-error mitigation for quantum expectation values", Nov. 30, 2020, pp. 1-33.

Hicks et al., "Readout Rebalancing for Near Term Quantum Computers," arXiv:2010.07496v1 [quant-ph] Oct. 15, 2020, 8 pages.

Tannu et al., "Mitigating Measurement Errors in Quantum Computers by Exploiting State-Dependent Bias," in Proceedings of the 52nd Annual IEEE/ACM International Symposium on Microarchitecture, MICRO '52 (Association for Computing Machinery, New York, NY, USA, 2019), 12 pages.

Lin et al., "Independent State and Measurement Characterization in Quantum Computers," arXiv:1910.07511v1 [quant-ph] Oct. 16, 2019, 5 pages.

Kwon et al., "A hybrid quantum-classical approach to mitigating measurement errors," arXiv:2003.12314v3 [quant-ph] Nov. 14, 2020, 11 pages.

Helsen et al., "A new class of efficient randomized benchmarking protocols," arXiv:1806.02048v2 [quant-ph] Jul. 30, 2019, 27 pages.

Flammia et al., "Efficient estimation of Pauli channels," arXiv:1907.12976v2 [quant-ph] Apr. 13, 2020, 31 pages.

Zheng et al., "A Bayesian Approach for Characterizing and Mitigating Gate and Measurement Errors," arXiv:2010.09188v1 [quant-ph] Oct. 19, 2020, 18 pages.

Peruzzo et al., "A variational eigenvalue solver on a photonic quantum processor," Nature Communications vol. 5, Article No. 4213 (2014), 7 pages.

Kandala et al., "Hardware-efficient Variational Quantum Eigensolver for Small Molecules and Quantum Magnets," Nature 549, 242 (2017), 24 pages.

Shor, "Scheme for reducing decoherence in quantum computer memory," Phys. Rev. A 52, R2493(R)—Published Oct. 1, 1995, 4 pages.

Devitt et al., "Quantum Error Correction for Beginners," Reports on Progress in Physics 76, 076001 (2013), 41 pages.

Jacak et al., "Quantum random number generators with entanglement for public randomness testing," Scientific Reports vol. 10, Article No. 164 (2020), 9 pages.

Chen et al., "Detector tomography on IBM quantum computers and mitigation of an imperfect measurement," Physical Review A 100, 052315 (2019), 17 pages.

Maciejewski et al., "Mitigation of readout noise in near-term quantum devices by classical post-processing based on detector tomography," Quantum 4, 257 (2020), 23 pages.

Lundeen et al., "Tomography of quantum detectors," Nature Physics 5, 27 (2009), 4 pages.

Fiurasek, "Maximum-likelihood estimation of quantum measurement," Physical Review A 64, 024102 (2001), 4 pages.

Steffen et al., "Measurement of the Entanglement of Two Superconducting Qubits via State Tomography," Science 313, 1423 (2006), 4 pages.

Hamilton et al., "Scalable quantum processor noise characterization," in 2020 IEEE International Conference on Quantum Computing and Engineering (QCE) (2020), 11 pages.

Geller et al., "Efficient correction of multiqubit measurement errors," arXiv:2001.09980v2 [quant-ph] Jul. 14, 2020, 11 pages.

Bravyi et al., "Mitigating measurement errors in multi-qubit experiments," arXiv:2006.14044v2 [quant-ph] Jul. 1, 2020, 13 pages.

Geller et al., "Rigorous measurement error correction," Quantum Science and Technology 5 (2020), 8 pages.

Nachman et al., "Unfolding Quantum Computer Readout Noise," arXiv:1910.01969v2 [quant-ph] May 2, 2020, 13 pages.

Erhard et al., "Characterizing large-scale quantum computers via cycle benchmarking," Nature Communications 10, 1 (2019), 13 pages.

Paris, et al., "Quantum State Estimation," vol. 649 (Springer Science & Business Media, 2004), 502 pages.

O'Malley et al., "Scalable Quantum Simulation of Molecular Energies," Physical Review X 6, 031007 (2016), 13 pages.

Havlicek et al., "Supervised learning with quantum enhanced feature spaces," Nature 567, 209 (2019), 22 pages.

Schuld et al., "Circuit-centric quantum classifiers," Physical Review A 101, 032308 (2020), 17 pages.

Gottesman, "Stabilizer Codes and Quantum Error Correction," arXiv preprint quant-ph/9705052 (1997), 122 pages.

Lidar et al., "Quantum Error Correction," (Cambridge university press, 2013), 21 pages.

Temme et al., "Error mitigation for short-depth quantum circuits," Physical review letters 119, 180509 (2017), 15 pages.

Li et al., "Efficient variational quantum simulator incorporating active error minimisation," Physical Review X 8, 031027 (2018), 14 pages.

Endo et al., "Practical Quantum Error Mitigation for Near-Future Applications," Physical Review X 8, 031027 (2018), 20 pages.

Bonet-Monroig et al., "Low-cost error mitigation by symmetry verification," Physical Review A 98, 062339 (2018), 11 pages.

Endo et al., "Hybrid quantum-classical algorithms and quantum error mitigation," arXiv:2011.01382v1 [quant-ph] Nov. 2, 2020, 39 pages.

Koczor, "Exponential Error Suppression for Near-Term Quantum Devices," arXiv:2011.05942v1 [quant-ph] Nov. 11, 2020, 21 pages.

Huggins et al., "Virtual Distillation for Quantum Error Mitigation," arXiv:2011.07064v1 [quant-ph] Nov. 13, 2020, 24 pages.

Kandala et al., "Error mitigation extends the computational reach of a noisy quantum processor,", Nature 567, 491 (2019), 11 pages.

Song et al., "Quantum computation with universal error mitigation on a superconducting quantum processor," Science Advances 5 (2019), 7 pages.

Haapasalo et al., "Quantum measurements on finite dimensional systems: relabeling and mixing," Quantum Information Processing 11, 1751 (2012), 13 pages.

Lowe et al., "Unified approach to data-driven quantum error mitigation," arXiv:2011.01157v1 [quant-ph] Nov. 2, 2020, 10 pages.

Examination report No. 1 for standard patent application dated Sep. 20, 2023 for Australian Patent Application No. 2021399066.

Response to the communication pursuant to R 161 (1) and R 162 EPC received for European Patent Application Serial No. 21840485.3 dated Jan. 25, 2024, 4 pages.

International Search Report and Written Opinion received for PCT Application Serial No. PCT/EP2021/085954 dated May 9, 2022, 14 pages.

The State Intellectual Property Office of People's Republic of China, "First Office Action", May 23, 2025, 16 Pages, CN Application No. 202180080689.1.

European Patent Office, "EP Examination Report", May 15, 2025, 08 pages, EP Application No 21840485.3.

(56) References Cited

OTHER PUBLICATIONS

Japan Patent Office, "Notice of Reasons for Refusal" Apr. 22, 2025, 12 Pages, JP Application No. 2023-535073.
Registration Procedure Notice for Chinese Application No. 202180080689.1 dated Sep. 29, 2025.

* cited by examiner

READOUT-ERROR MITIGATION FOR QUANTUM EXPECTATION

BACKGROUND

The subject disclosure relates to quantum computing using quantum circuits. Quantum computing employs quantum physics to encode and process information rather than binary digital techniques based on transistors. A quantum computing device can employ quantum bits (also referred to as qubits) that operate according to the laws of quantum physics and can exhibit phenomena such as superposition and entanglement. The superposition principle of quantum physics allows qubits to be in a state that partially represent both a value of "1" and a value of "0" at the same time. The entanglement principle of quantum physics allows qubits to be correlated with each other such that the combined states of the qubits cannot be factored individual qubit states. For instance, a state of a first qubit can depend on a state of a second qubit. As such, a quantum circuit can employ qubits to encode and process information in a manner that can be significantly different from binary digital techniques based on transistors.

Quantum computing can be utilized to perform quantum programming. Quantum programming can involve the process of assembling sequences of instructions, which can be called quantum programs, that can be capable of running on a quantum computer. Each quantum program can be associated with a collection of quantum circuits. When a quantum program is executed, a result can be produced by the quantum computer. The performance of a quantum computer can depend in significant part not just on the fidelity of unitary gates of the quantum circuit, but also on the fidelity of a quantum readout of the result. In traditional quantum computers, there often can be an undesirable amount of error in the quantum readout.

One general approach of some conventional readout-error mitigation approaches can be to estimate the transition matrix A using quantum detector tomography, and apply the inverse to obtain an estimate of the ideal probability vector. Under the assumption that the readout error is independent for each qubit, it can be determined that $A = A_1 \otimes \cdots \otimes A_n$, where each 2-by-2 matrix $A_i$ can represent a classical bit-flip channel, and where certain elements of the matrix $A_i$ can denote the probability of measuring 1 instead of 0, and the opposite for certain other elements. Although this conventional approach might be relatively easy to implement for practical applications, such conventional approach can undesirably fail to capture crosstalk and other dependencies between qubits.

In some conventional approaches, a representation based on cumulant expansion can be employed to capture correlations between variables. However, such conventional approaches do not comprise or provide an algorithm for using such a representation in the context of error mitigation.

In still other conventional approaches, crosstalk can be incorporated in the model to some extent by taking into account pairwise qubit interactions. To capture crosstalk, a conventional approach considers a correlated noise model based on continuous-time Markov processes and proposes a technique to avoid explicit computation of the inverse transition matrix. The noise model in this conventional approach can be represented using only $2n^2$ parameters. A general difficulty and drawback associated with matrix inversion across the different conventional approaches can be that the resulting probability vector $\hat{p}$ may be non-physical: the vector could contain negative entries or sum up to a value other than one. While there may be some ways to ensure that the estimated probability vector is physical, such as by estimating the probability vector based on constrained optimization, some drawbacks to conventional techniques that estimate the probability vector based on constrained optimization can be that they are not expected to scale well with system size.

These and other deficiencies of traditional approaches for estimating quantum-computing readout results and attempting to mitigate readout errors can result in inefficient, ineffective, and/or inaccurate estimation of quantum-computing readout results and mitigation of readout errors.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, computer-implemented methods, apparatuses, and/or computer program products that can mitigate readout errors of readout results for quantum expectation are provided.

An embodiment relates to a computer-implemented method that comprises applying, by a system operatively coupled to a processor, first random Pauli gates to qubits at a first output of a first circuit prior to first readout measurements of the qubits. The computer-implemented method also can comprise applying, by the system, second random Pauli gates to the qubits at a second output of a second circuit prior to second readout measurements of the qubits. Such embodiments of the method can provide a number of advantages, including that the method can more efficiently and accurately estimate quantum-computing readout results.

In some embodiments, the computer-implemented method also can comprise: determining, by the system, calibration information based on a first defined function and the first readout measurements measured at the first output of the first circuit; and determining, by the system, estimation information based on the first defined function and the second readout measurements measured at the second output of the second circuit. In certain embodiments, the computer-implemented method further can comprise: determining, by the system, a normalization scalar value based on the calibration information and a second defined function; determining, by the system, an estimation scalar value based on the estimation information and the second defined function; and determining, by the system, an error-mitigated readout determination associated with the circuit of interest based on the normalization scalar value and the estimation scalar value. These embodiments of the method can provide a number of advantages, including that the method can more efficiently and accurately estimate quantum-computing readout results, and can perform operations that can be executed in an efficient and less complex manner.

In some embodiments, elements described in connection with the disclosed methods can be embodied in different forms such as a system, a computer program product, or another form.

According to another embodiment, a system comprising a memory that stores computer-executable components; and a processor, operatively coupled to the memory, that executes computer-executable components. The computer-executable components can comprise a calibration component that applies first random Pauli gates to qubits at a first output of a first circuit prior to first readout measurements of the qubits. The computer-executable components also can include an estimation component that applies pairs of random Pauli gates to the qubits associated with a second circuit, comprising application of second random Pauli gates to the qubits at a second output of the second circuit, prior to second readout measurements of the qubits. Such embodiments of the system can provide a number of advantages, including that the method can more efficiently and accurately estimate quantum-computing readout results.

In certain embodiments, the system also can comprise that the calibration component can determine calibration data based on a first defined function and the first readout measurements measured at the first output of the first circuit with regard to the first random Pauli gates, and the estimation component can determine estimation data based on the first defined function and the second readout measurements measured at the second output of the second circuit with regard to the second random Pauli gates. In some embodiments, the system can further comprise that the estimation component determines a normalization scalar value based on the calibration data and a second defined function, determines an estimation scalar value based on the estimation data and the second defined function, and determines the error-mitigated readout determination associated with the circuit of interest based on the normalization scalar value and the estimation scalar value. Such embodiments of the system can provide a number of advantages, including that the system can more efficiently and accurately estimate quantum-computing readout results, and can perform operations that can be executed in an efficient and less complex manner.

In some embodiments, elements described in connection with the disclosed systems can be embodied in different forms such as a computer-implemented method, a computer program product, or another form.

These and other features will become apparent from the following detailed description of illustrative embodiments thereof, which is to be read in connection with the accompanying drawings.

DETAILED DESCRIPTION

Figure 1:
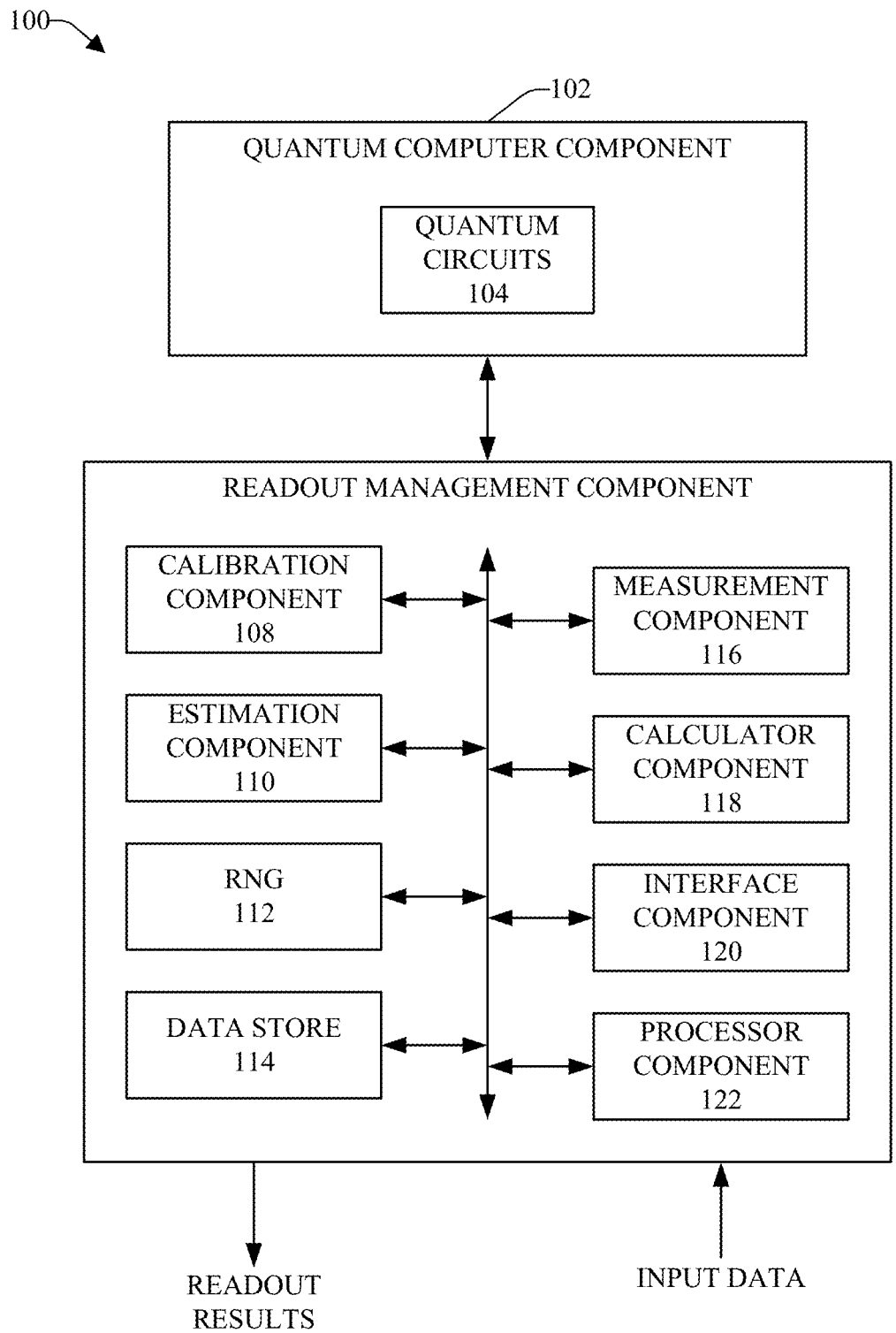
FIG. 1 illustrates a block diagram of an example, non-limiting system that can desirably mitigate readout error associated with readout results produced by a quantum computer, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum programming can involve the process of assembling sequences of instructions, which can be called quantum programs, that can be capable of running on a quantum computer. Each quantum program can be associated with a collection of quantum circuits. When a quantum program is executed, a result (e.g., an estimated value) can be produced by the quantum computer. The performance of a quantum computer can depend in significant part not just on the fidelity of unitary gates of the quantum circuit, but also on the fidelity of a quantum readout of the result. In traditional quantum computing, there often can be an undesirable amount of error in the quantum readout and/or estimating or producing the readout results can be inefficient.

Some conventional readout-error mitigation approaches can estimate the transition matrix A using quantum detector tomography, and apply the inverse to obtain an estimate of the ideal probability vector. Under the assumption that the readout error is independent for each qubit, it can be determined that $A = A_1 \otimes \cdots \otimes A_n$, where each 2-by-2 matrix $A_i$ can represent a classical bit-flip channel, and where certain elements of the matrix $A_i$ can denote the probability of measuring 1 instead of 0, and the opposite for certain other elements. Although this conventional approach might be relatively easy to implement for practical applications, such conventional approach can undesirably fail to capture crosstalk and other dependencies between qubits.

In certain conventional approaches, a representation based on cumulant expansion can be employed to capture correlations between variables. However, such conventional approaches do not comprise or provide an algorithm for using such a representation in the context of error mitigation.

In still other conventional approaches, crosstalk can be incorporated in the model to some extent by taking into account pairwise qubit interactions. To capture crosstalk, a conventional approach considers a correlated noise model based on continuous-time Markov processes and proposes a technique to avoid explicit computation of the inverse transition matrix. The noise model in this conventional approach can be represented using only $2n^2$ parameters. A general difficulty and drawback associated with matrix inversion across the different conventional approaches can be that the resulting probability vector $\hat{p}$ may be non-physical: the vector could contain negative entries or sum up to a value other than one. While there may be some ways to ensure that the estimated probability vector is physical, such as by estimating the probability vector based on constrained optimization, some drawbacks to conventional techniques that estimate the probability vector based on constrained optimization can be that they are not expected to scale well with system size.

It can be desirable to be able to mitigate the effect of readout errors, including multi-qubit correlated and state-dependent errors, particularly doing so in a practical and efficient manner. The disclosed subject matter can be implemented to produce a solution to all or at least some of these problems and/or other problems with traditional quantum computing and readout of results of quantum computing, including introducing robust, practical, desirably implementable protocols that can desirably mitigate readout errors and the effect of readout errors in state and process tomography (e.g., partial state tomography and partial process tomography) using randomization of the circuit. The disclosed subject matter can provide an unbiased estimate of the readout result and can remove asymmetry in the readout errors. The techniques and protocols of the disclosed subject matter can be dynamically adjusted to make it resilient against time-variations in the noise associated with quantum computing, which can be quite useful for the success of any mitigation scheme on a near-term device.

To that end, the various aspects and embodiments herein relate to techniques for mitigating readout error for quantum expectation. The disclosed subject matter can comprise a readout management component (RMC) that can mitigate readout errors for quantum expectation associated with quantum computing. The RMC can comprise a calibration component that can apply first random Pauli gates (or corresponding first Pauli operators) to qubit components (also referred to herein as qubits) at a first output of a first circuit prior to first readout measurements of the qubits or the first circuit. With regard to a second circuit, which can comprise a third circuit that can be a circuit of interest, the RMC also can comprise an estimation component that can apply second random Pauli gates (or corresponding second Pauli operators) to the qubits at a second output of the second circuit prior to second readout measurements of the qubits or the second circuit, and can generate an error-mitigated readout determination (e.g., a readout result that can have error desirably mitigated) associated with the circuit of interest based on the first random Pauli gates applied to the qubits at the first output of the first circuit and the second random Pauli gates applied to the qubits at the second output of the second circuit. Such estimation process can be utilized, for example, with regard to state tomography (e.g., partial state tomography). To facilitate such error-mitigated readout determination, the calibration component can determine calibration data based on the first readout measurements and a first defined function, and the estimation component can determine estimation data based on the second readout measurements and the first defined function. The estimation component can determine a normalization scalar value based on the calibration data and a second defined function, and can determine an estimation scalar value based on the estimation data and the second defined function. The estimation component can determine the error-mitigated readout determination (e.g., error-mitigated readout result) associated with the circuit of interest based on (e.g., as a function of) the normalization scalar value and estimation scalar value.

In other embodiments, for example, with regard to process tomography (e.g., partial process tomography), during the estimation process, instead of only utilizing random Pauli gates applied at an output of a circuit, the RMC can utilize and apply pairs of random Pauli gates to a circuit, as more fully described herein. For instance, the RMC, employing the calibration component, can apply first random Pauli gates (or corresponding Pauli operators) to qubits at a first output of a first circuit prior to first readout measurements of the qubits or the first circuit. With regard to a second circuit, which can comprise a third circuit that can be a circuit of interest, the estimation component can apply pairs of random Pauli gates (or corresponding Pauli operators) to the qubits associated with the second circuit, comprising applying second random Pauli gates to the qubits or the circuit of interest at a second output of the second circuit and applying third random Pauli gates to the qubits or the circuit of interest at an input of the circuit of interest, prior to second readout measurements of the qubits or the second circuit. The estimation component can generate an error-mitigated readout determination associated with the circuit of interest based on the first random Pauli gates applied to the qubits or the first circuit and based on the pairs of random Pauli gates applied to the qubits or the second circuit, as more fully described herein.

These and other aspects and embodiments of the disclosed subject matter will now be described with respect to the drawings.

FIG. 1 illustrates a block diagram of an example, non-limiting system 100 that can desirably mitigate readout error associated with readout results produced by a quantum computer, in accordance with various aspects and embodiments of the disclosed subject matter. The system 100 can comprise a quantum computer component 102 that can include various quantum devices, quantum circuitry, and/or other components. The quantum devices can comprise, for example, qubit components (also referred to herein as qubits). The quantum computer component 102 can be programmed and desired quantum circuits 104, comprising qubits and other quantum devices, circuitry, and components, can be formed, for example, based on, a set of instructions (e.g., assembled sequence of instructions) that can be input to and run (e.g., executed) on the quantum computer component 102 to create and operate desired quantum circuits 104, wherein the structure of the quantum circuits 104, and operations (e.g., quantum operations) performed by the quantum circuits 104, can be based on the set of instructions. In response to execution of a quantum program, comprising or associated with the set of instructions and/or comprising input data or parameter data, and operation of the quantum circuits 104 based on such quantum program, the quantum computer component 102 can produce results (e.g., data results), which also can be referred to as readout results or readout determinations. The quantum computer component 102 can present (e.g., communicate or transmit) the results as an output.

Traditionally, there can be undesirable readout errors associated with readout results output by quantum computers, such as described herein. It can be desirable to be able to mitigate the effect of readout errors, including multi-qubit correlated and state-dependent errors, and particularly, to do so in a practical manner. The disclosed subject matter can provide a solution to these problems and/or other problems with traditional quantum computing and readout of results of quantum computing.

To facilitate desirably mitigating error in readout results, and to do so in a quick and efficient manner, the system 100 can comprise a readout management component (RMC) 106 that can be associated with (e.g., communicatively connected to) the quantum computer component 102. The RMC 106 can desirably (e.g., efficiently, quickly, and optimally) manage the production of readout results to mitigate (e.g., reduce or minimize) readout errors. For instance, the RMC 106 can manage the production of readout results to mitigate readout errors in partial state tomography and partial process tomography using randomization associated with a circuit, in accordance with defined readout management criteria. In doing so, the RMC 106 can provide an unbiased estimate of the readout result and can remove asymmetry in readout errors. The error-mitigation techniques employed by the RMC 106 can enable and can implement dynamic adjustments to make the techniques resilient against time-variations in the noise that can otherwise cause readout errors, which can be useful and desirable in enabling the success of a mitigation scheme on a near-term device. The error-mitigation techniques employed by the RMC 106 also desirably do not rely on a particular noise model.

In accordance with various embodiments, the RMC 106 can utilize various estimation protocols to facilitate mitigating readout errors associated with readout results produced by the quantum computer component 102. The estimation protocols can comprise, for example, an acquire data protocol (also referred to as Protocol AcquireData) that can specify a process for sampling and acquiring data, and performing measurements of outputs (e.g., measured responses) of circuits under various conditions, a first protocol (also referred to as Protocol 1 or partial state tomography-related protocol) and a second protocol (also referred to as Protocol 2 or partial process tomography-related protocol) that each can utilize the acquire data protocol to generate an error-mitigated readout result (e.g., an error-mitigated readout determination or error-mitigated readout estimate or average of a value) associated with a desired circuit (e.g., circuit of interest), as more fully described herein. The Protocol AcquireData and Protocol 1 can be utilized, for example, with regard to readout results of the quantum computer component 102 associated with partial state tomography. The Protocol AcquireData and Protocol 2 can be utilized, for example, with regard to readout results of the quantum computer component 102 associated with partial process tomography. To facilitate implementation of the protocols, the RMC 106 can comprise a calibration component 108 that can perform a calibration process that can produce calibration data that can be used to mitigate readout errors and can provide a benchmark associated with the circuit, and an estimation component 110 that can perform an estimation process that can produce estimation data that can be used, along with the calibration data, to provide a readout result that can be desirably error mitigated, as more fully described herein.

Figure 2:
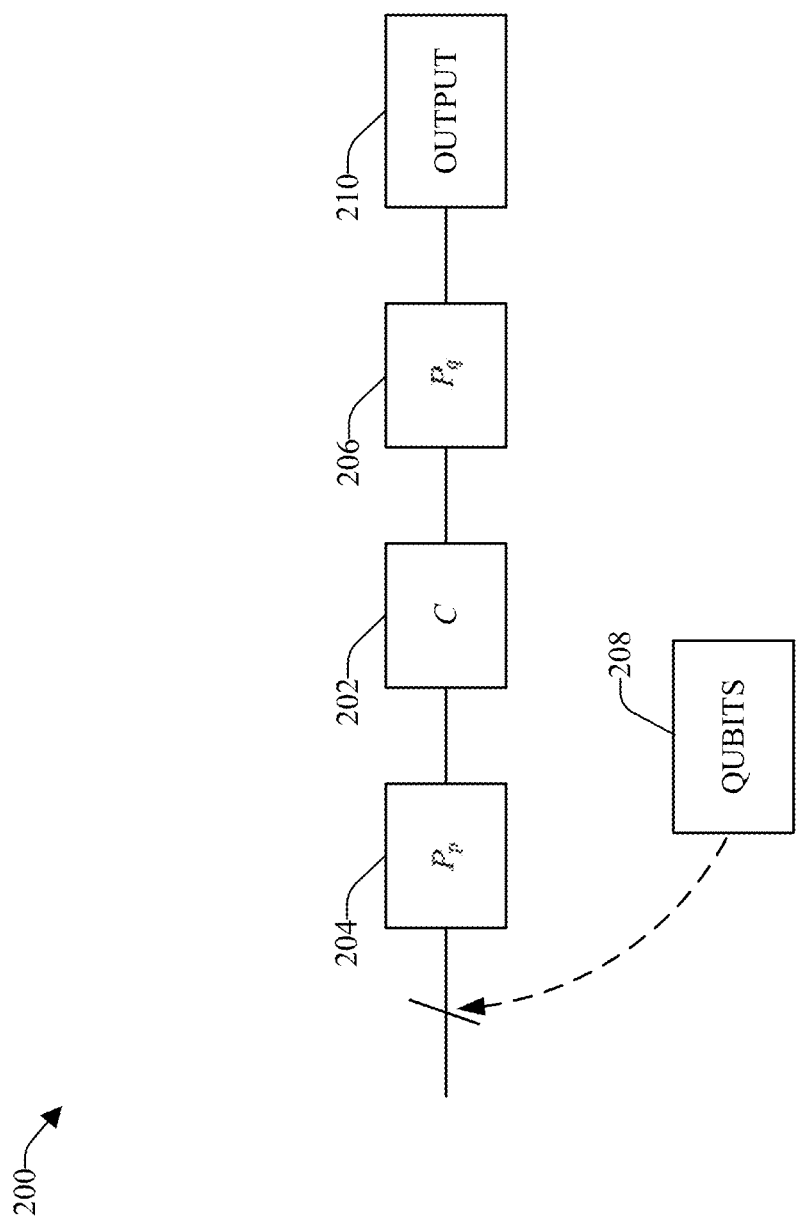
FIGS. 2, 3, and 4 depict block diagrams of example circuits that can be utilized to facilitate producing error-mitigated readout results, in accordance with various aspects and embodiments of the disclosed subject matter.
Figure 3:
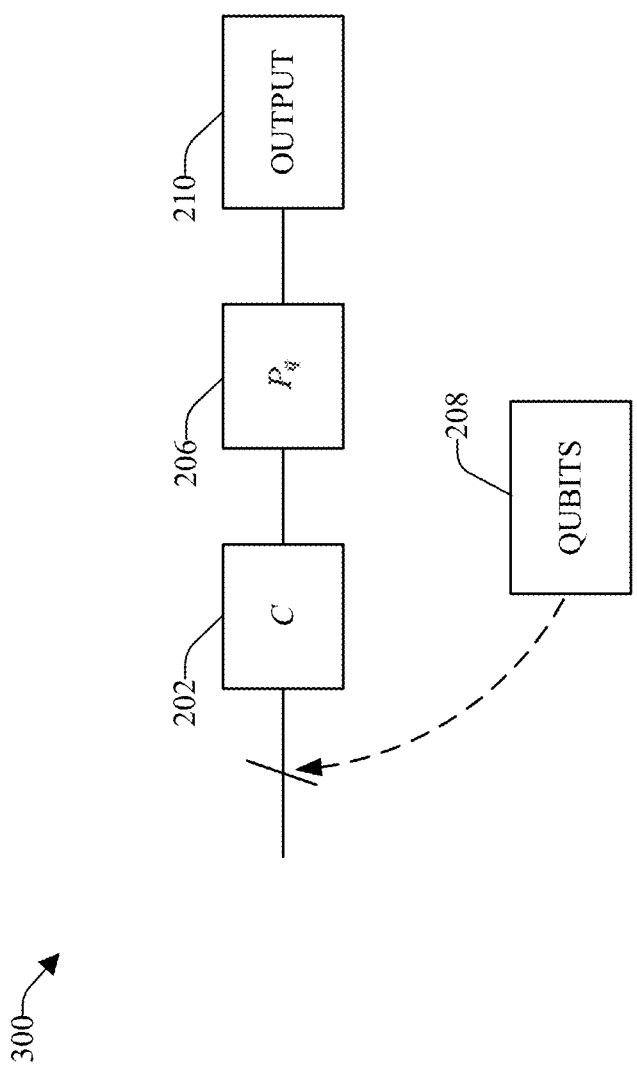
Figure 4:
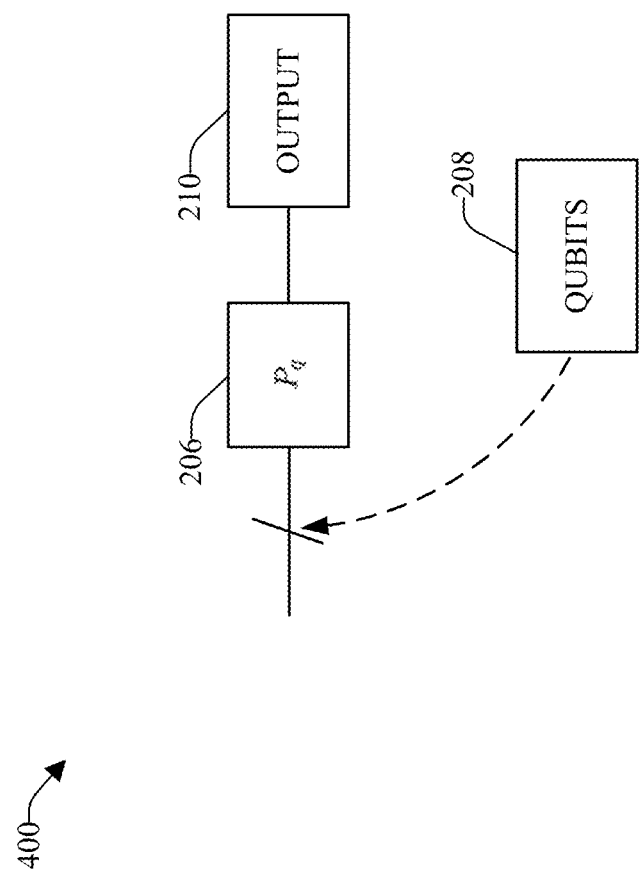

Referring to FIGS. 2, 3, and 4 (along with FIG. 1), FIGS. 2, 3, and 4 depict block diagrams of example circuits that can be utilized to facilitate producing error-mitigated readout results, in accordance with various aspects and embodiments of the disclosed subject matter. FIG. 2 illustrates a block diagram of an example circuit 200 that can comprise a circuit of interest (C) and Pauli operations (using Pauli operators $P_p$ and $P_q$) that can be indexed (e.g., indexed by integers p and q), in accordance with various aspects and embodiments of the disclosed subject matter. The circuit 200 can comprise a circuit of interest (C) 202 that can be a circuit (e.g., quantum circuit) that can be utilized to determine or generate readout results (e.g., readout determinations or estimations) in response to input data. The circuit 200 can comprise or employ various desired components and circuitry (e.g., quantum components and circuitry) of the quantum computer component 102 to perform desired operations (e.g., quantum operations) on data (e.g., input data or other data). The circuit 200 also can comprise Pauli operators, including Pauli operators ($P_p$) 204 that can be associated with (e.g., situated at and/or connected to) an input of the circuit 202 and Pauli operators ($P_q$) 206 that can be associated with (e.g., situated at and/or connected to) an output of the circuit 202, that can perform Pauli operations on data (e.g., input data or other data). Respective Pauli operators can be associated with respective values p and q, and can perform respective (e.g., different or unique) Pauli operations on data. Respective Pauli operators also can be associated with and/or can correspond to respective Pauli gates (e.g., Pauli gates employed in a circuit, such as circuit 200) and/or respective Pauli matrices.

The circuit 200 also can comprise desired qubits 208 (e.g., of the quantum computer component 102) that can be associated with (e.g., part of or connected to) the circuit 202 (wherein a set of qubits, comprising one or more qubits 208, can be represented in the circuit 200 by the diagonal line (e.g., slash mark) through the horizontal line, as illustrated in circuit 200). The RMC 106 can measure responses of the circuit 200 (e.g., to input data) at the output 210 of the circuit 200.

FIG. 3 depicts a block diagram of an example circuit 300 that can comprise a circuit of interest (C) and Pauli operations, as indexed, wherein p=0 and $P_0$=I, which can result, in effect, in implementing Pauli operations, which can be indexed by integer q, in connection with the circuit of interest, in accordance with various aspects and embodiments of the disclosed subject matter. The circuit 300 can comprise the circuit of interest 202, Pauli operators $P_q$ 206, qubits 208 (wherein a set of qubits, comprising one or more qubits 208, can be represented in the circuit 300 by the diagonal line through the horizontal line, as illustrated in circuit 300), and/or other components (e.g., quantum components). Since p=0 and $P_0$=I with regard to $P_p$, $P_p$ can, in effect, not influence or alter the responses of the circuit 300, and thus, is not shown or part of, or at least is not explicitly shown or part of, the circuit 300. Similar to FIG. 2, the RMC 106 can measure responses of the circuit 200 (e.g., to input data) at the output 210 of the circuit 300.

FIG. 4 illustrates a block diagram of an example circuit 400 that can comprise Pauli operations, as indexed, wherein p=0 and $P_0$=I, and wherein C=I, which can result in the circuit 400, in effect, employing Pauli operations indexed by integer q, in accordance with various aspects and embodiments of the disclosed subject matter. The circuit 300 can comprise Pauli operators ($P_q$) 206, qubits 208 (wherein a set of qubits, comprising one or more qubits 208, can be represented in the circuit 400 by the diagonal line through the horizontal line, as illustrated in circuit 400), and/or other components (e.g., quantum components). Since p=0 and $P_0$=I with regard to $P_p$, and since C=I, $P_p$ and C can, in effect, not influence or alter the responses of the circuit 400, and thus, is not shown or part of, or at least is not explicitly shown or part of, the circuit 400. Similar to FIG. 2, the RMC 106 can measure responses of the circuit 200 (e.g., to input data) at the output 210 of the circuit 400.

In accordance with various embodiments, with regard to state tomography (e.g., partial state tomography), the calibration component 108 can implement the Protocol AcquireData and Protocol 1 to facilitate generating a desirable readout result (e.g., an error-mitigated readout determination or estimation value). As part of the Protocol AcquireData and the Protocol 1, the calibration component 108 initially can utilize the circuit 400 where p=0 and $P_0$=I, and wherein C=I, which can result in the circuit, in effect, employing Pauli operations indexed by integer q.

In accordance with the Protocol AcquireData and the Protocol 1, as part of the calibration process, the calibration component 108 can randomly sample a subset of first Pauli operators (e.g., first random Pauli operators), $P_q$ 206, from a set of available Pauli operators based on respective random values (e.g., randomly generated numbers) associated with respective random Pauli operators (and/or corresponding Pauli gates). In some embodiments, the calibration component 108 can uniformly sample the first random Pauli operators, $P_q$ 206, from the set of available Pauli operators. In other embodiments, if and as desired, the calibration component 108 can sample the first random Pauli operators, $P_q$ 206, from the set of available Pauli operators in a non-uniform manner. The number of Pauli operators, $P_q$ 206, sampled as part of the calibration process can be a desired number N, wherein N can be a desired integer value, in accordance with the defined readout management criteria.

The RMC 106 can employ a random number generator (RNG) 112 to generate random numbers for any operation described herein that utilizes random numbers. The RNG 112 can be a true random number generator that can generate true random numbers or a pseudo random number generator that can generate pseudo random numbers, in accordance with a desired RNG algorithm. Respective values (e.g., numbers) can be associated with (e.g., linked or mapped to) respective Pauli operators of the set of available Pauli operators (and/or corresponding Pauli gates), and wherein information relating to the associating (e.g., linking or mapping) of respective numbers with (or to) respective Pauli operators can be stored in, and retrieved from, a data store 114 to facilitate determining which Pauli operator is associated with which value.

The calibration component 108 can apply (e.g., in respective instances) respective Pauli operators of the first random Pauli operators (or corresponding Pauli gates), $P_q$ 206, to qubits 208 at an output of the circuit 400 prior to first readout measurements of the qubits 208 or the circuit 400. The calibration component 108 can employ a measurement component 116 of the RMC 106 to measure respective first responses at the output of the circuit 400 (e.g., applied to initial state $|0\rangle$) based on the respective first random Pauli operators (e.g., applied in respective instances for respective measurements) and input data applied to the circuit 400. The first responses can be the first readout measurements. The calibration component 108 can perform a desired number M (e.g., one or more) readout measurements (e.g., one or more first readout measurements) for each of the first random Pauli operators, $P_q$ 206, wherein M can be a desired integer number, in accordance with the defined readout management criteria. The calibration component 108 can store the respective first readout measurements and associated respective first values (e.g., respective q values) in the data store 114, wherein the respective first values can be associated with (e.g., linked, mapped, or appended to) the respective first readout measurements and the respective first random Pauli operators, $P_q$ 206. In some embodiments, the respective first values can correspond to the respective random numbers used to determine and select the respective first random Pauli operators.

In accordance with the Protocol AcquireData and the Protocol 1, as part of the estimation process, the estimation component 110 can utilize the circuit 300 of FIG. 3, wherein the circuit 300 can comprise the circuit of interest 202 and Pauli operators, $P_q$ 206, that can be applied to the output of the circuit 300. The estimation component 110 can randomly sample (e.g., uniformly sample or non-uniformly sample) a subset (e.g., N) of second Pauli operators (e.g., second random Pauli operators), $P_q$ 206, from the set of available Pauli operators based on respective random values associated with respective random Pauli operators (and/or corresponding Pauli gates). The estimation component 110 can apply (e.g., in respective instances) respective Pauli operators of the second random Pauli operators (e.g., $P_q$ 206) to the qubits 208 or the circuit of interest 202 at an output of the circuit 300 prior to second readout measurements of the qubits 208 or the circuit of interest 202. The estimation component 110 can employ the measurement component 116 to measure respective second responses at the output of the circuit 300 based on respective second random Pauli operators (e.g., applied in respective instances for respective measurements) and input data applied to the circuit 300. The respective second responses can be the respective second readout measurements. The estimation component 110 can store the respective second readout measurements and associated respective second values in the data store 114, wherein the respective second values can be associated with (e.g., linked, mapped, or appended to) the respective second readout measurements and the respective second random Pauli operators (e.g., $P_q$ 206). In some embodiments, the respective second values can correspond to the respective random numbers used to determine and select the respective second random Pauli operators.

In accordance with the Protocol AcquireData and the Protocol 1, the calibration component 108 or estimation component 110 can determine and/or generate calibration data based on (e.g., as a function of) the first readout measurements measured at the output of the circuit 400 and a first defined function, such as more fully described herein. The estimation component 110 can determine and/or generate estimation data based on the second readout measurements measured at the output of the circuit 300 and the first defined function, such as more fully described herein. The estimation component 110 can determine and/or generate a normalization scalar value based on (e.g., as a function of) the calibration data and a second defined function, such as more fully described herein. The estimation component 110 can determine and/or generate an estimation scalar value based on the estimation data and the second defined function, such as more fully described herein. The RMC 106 can comprise a calculator component 118 that can be utilized by the calibration component 108, estimation component 110, or other component of the RMC 106 to perform various calculations in connections with various operations and the various protocols, such as described above and as more fully described herein.

The estimation component 110 can determine and/or generate a readout result (e.g., an error-mitigated readout determination) associated with the circuit of interest 202 based on (e.g., as a function of) the normalization scalar value and the estimation scalar value, such as more fully described herein. The readout result can be an estimated (e.g., an unbiased estimation of) or expected readout result (e.g., a readout result determined and generated by the quantum computer component 102 in conjunction with, and as processed by, the RMC 106) with any readout error being desirably mitigated (e.g., reduced, minimized, or substantially eliminated). The readout result can be, for example, an expected error-free readout determination or estimation (e.g., a readout result that can have a value that can be expected (e.g., a quantum expectation) when there is no error).

The RMC 106 can provide (e.g., communicate or produce) the error-mitigated readout result as an output, wherein the error-mitigated readout result can be presented or displayed by an interface component 120 (e.g., display component, comprising a display screen and interfaces, and/or an audio component, comprising audio interfaces). The interface component 120 can present or display readout results. The interface component 120 also can receive input data, quantum program information (e.g., instructions), and/or other information that can be processed by the RMC 106 and/or provided to the quantum computer component 102 to facilitate execution of quantum programs and generation of readout results.

In accordance with various embodiments, with regard to process tomography (e.g., partial process tomography), the calibration component 108 can implement the Protocol AcquireData and Protocol 2 to facilitate generating a desirable readout result (e.g., an error-mitigated readout determination or estimation value). As part of the Protocol AcquireData and Protocol 2, the calibration component 108 perform a same or similar calibration process as employed with regard to Protocol 1, as more fully described herein, or can use the calibration data and/or calibration results of the calibration process performed in connection with Protocol 1 (if Protocol 1 had been performed prior thereto). For instance, the calibration component 108 can randomly sample a subset of first Pauli operators (e.g., first random Pauli operators), $P_q$ 206, can apply the first random Pauli operators to the qubits 208 at an output of the circuit 400 prior to first readout measurements of the qubits 208 or the circuit 400, can measure respective first responses (e.g., first readout measurements) at the output of the circuit 400 (e.g., applied to initial state $|0\rangle$)) based on the respective first random Pauli operators and input data applied to the circuit 400, and can store the respective first readout measurements and associated respective first values in the data store 114, such as more fully described herein.

In accordance with the Protocol AcquireData and the Protocol 2, as part of the estimation process, the estimation component 110 can utilize the circuit 200 of FIG. 2, wherein the circuit 200 can comprise the circuit of interest 202 and Pauli operators, $P_p$ 204, and Pauli operators, $P_q$ 206, wherein Pauli operators, $P_p$ 204, can be applied to an input of the circuit 200, and wherein Pauli operators, $P_q$ 206, can be applied to the output of the circuit 200. The estimation component 110 can randomly sample (e.g., uniformly sample or non-uniformly sample) pairs of Pauli operators (e.g., $P_p$ 204 and $P_q$ 206), comprising a subset (e.g., N) of second Pauli operators (e.g., second random Pauli operators), $P_q$ 206, and a subset (e.g., N) of third Pauli operators (e.g., third random Pauli operators), $P_p$ 204, from the set of available Pauli operators based on respective random values associated with respective random Pauli operators (and/or corresponding Pauli gates).

The estimation component 110 can apply (e.g., in respective instances) the pairs of random Pauli operators to the qubits 208 or the circuit of interest 202. For instance, the estimation component 110 can apply (e.g., in respective instances) the second random Pauli operators, $P_q$ 206, to the qubits 208 or the circuit of interest 202 at the output of the circuit 200, and can apply (e.g., in respective instances) the third random Pauli operators, $P_p$ 204, to the qubits 208 or circuit of interest 202 at the input of the circuit 200, prior to second readout measurements of the qubits 208 or the circuit 200. The estimation component 110 can employ the measurement component 116 to measure respective second responses at the output of the circuit 200 based on respective second random Pauli operators ($P_q$ 206) (e.g., applied in respective instances for respective measurements), respective third random Pauli operators ($P_p$ 204) (e.g., applied in respective instances for respective measurements), and input data applied to the circuit 200. The respective second responses can be the respective second readout measurements. The estimation component 110 can store the respective second readout measurements, and associated respective second values (e.g., q values) and respective third values (e.g., p values), in the data store 114. The respective second values and the respective third values can be associated with (e.g., linked, mapped, or appended to) the respective second readout measurements, wherein the respective second values (e.g., q values) can be associated with the second random Pauli operators ($P_q$ 206), and wherein the respective third values (e.g., p values) can be associated with the third random Pauli operators ($P_p$ 204).

In accordance with the Protocol AcquireData and the Protocol 2, the calibration component 108 or estimation component 110 can determine and/or generate calibration data based on (e.g., as a function of) the first readout measurements measured at the output of the circuit 400 and the first defined function, such as more fully described herein. The estimation component 110 also can determine and/or generate estimation data based on the second readout measurements measured at the output of the circuit 200 and the first defined function, such as more fully described herein. The estimation component 110 further can determine and/or generate a normalization scalar value based on (e.g., as a function of) the calibration data and a second defined function, such as more fully described herein. The estimation component 110 also can determine and/or generate an estimation scalar value based on the estimation data and the second defined function, such as more fully described herein.

The estimation component 110 can determine and/or generate a readout result (e.g., an error-mitigated readout determination) associated with the circuit of interest 202 based on (e.g., as a function of) the normalization scalar value and the estimation scalar value, such as more fully described herein. The readout result can be an estimated (e.g., an unbiased estimation of) or expected readout result (e.g., a readout result determined and generated by the quantum computer component 102 in conjunction with, and as processed by, the RMC 106) with any readout error being desirably mitigated (e.g., reduced, minimized, or substantially eliminated). The readout result can be, for example, an expected error-free readout determination or estimation. The RMC 106 can provide (e.g., communicate or produce) the error-mitigated readout result as an output. For instance, the interface component can present or display the error-mitigated readout result.

In accordance with various embodiments, the RMC 106 also can comprise (as depicted) or be associated with a processor component 122 that can work in conjunction with the other components (e.g., calibration component 108, estimation component 110, RNG 112, data store 114, measurement component 116, calculator component 118, interface component 120, or other component) to facilitate performing the various functions of the RMC 106. The processor component 122 can employ one or more processors, microprocessors, or controllers that can process data, such as information relating to circuits (e.g., quantum circuitry), qubits, quantum components or devices, Pauli operators, Pauli gates, Pauli matrices, calibration processes, estimation processes, functions, algorithms (e.g., algorithms as indicated or defined by the processes, protocols, methods, and/or techniques described herein; and/or quantum algorithms), quantum logic, defined readout management criteria, traffic flows, policies, protocols, interfaces, tools, and/or other information, to facilitate operation of the RMC 106, as more fully disclosed herein, and control data flow between the RMC 106 and other components (e.g., quantum computer component 102, quantum programs, data storage devices, user devices or end-point devices, or other computing or communication devices) associated with (e.g., connected to) the RMC 106.

With further regard to the data store 114, the data store 114 can store data structures (e.g., user data, metadata), code structure(s) (e.g., modules, objects, hashes, classes, procedures) or instructions, information relating to circuits (e.g., quantum circuitry), qubits, quantum components or devices, Pauli operators, Pauli gates, Pauli matrices, calibration processes, estimation processes, functions, algorithms (e.g., algorithms as indicated or defined by the processes, protocols, methods, and/or techniques described herein; and/or quantum algorithms), quantum logic, defined readout management criteria, traffic flows, policies, protocols, interfaces, tools, and/or other information, to facilitate controlling operations associated with the RMC 106. In an aspect, the processor component 122 can be functionally coupled (e.g., through a memory bus) to the data store 114 in order to store and retrieve information desired to operate and/or confer functionality, at least in part, to the calibration component 108, estimation component 110, RNG 112, data store 114, measurement component 116, calculator component 118, interface component 120, or other component, and/or substantially any other operational aspects of the RMC 106.

These and other aspects and embodiments regarding the estimation and readout error mitigation techniques and estimation protocols of the disclosed subject matter will now be further described.

A primary component for the successful execution of a quantum algorithm can be the ability to access the outcome through measurements. One of the significant challenges in quantum computing can be dealing with readout errors. The disclosed subject matter can enable the mitigation of readout errors in the computation of expectation values of Pauli observables, which appear in a wide range of applications ranging from partial tomography of quantum states and processes to electronic structure determination using variational quantum eigensolvers (VQE). In this setting, it is not necessary to correct individual measurements as used, for instance, in quantum error correction and random number generation.

The measurement output of a quantum circuit can be characterized by an ideal probability vector p. A noisy readout typically can be represented by a classical noise map. For an n-qubit system, this map can be represented by a $2^n$-by-$2^n$ left-stochastic matrix A where entry $A_{i,j}$ in the matrix can denote the probability of measuring i instead of j. It follows that the noisy probability vector can be given by the linear transformation $\tilde{p}=Ap$. A general approach of some conventional readout-error mitigation approaches can be to estimate the transition matrix A using quantum detector tomography, and apply the inverse to obtain an estimate of the ideal probability vector: $\hat{p}=A^{-1}\tilde{p}$. Under the assumption that the readout error is independent for each qubit, it can be determined that $A=A_1\otimes\cdots\otimes A_n$, where each 2-by-2 matrix $A_i$ can represent a classical bit-flip channel, $$A_i = \begin{pmatrix} 1-r_i & s_i \\ r_i & 1-s_i \end{pmatrix}, \quad \text{Eq. (1)}$$

where $r_i$ can denote the probability of measuring 1 instead of 0, and the opposite for $s_i$. Although this approach can be relatively easy to implement for practical applications, such an approach can fail to capture crosstalk and other dependencies between qubits. In theory, crosstalk can be captured by working with the complete A matrix, but given the exponential number of calibration circuits and memory requirements just to estimate and store the matrix, this is not practical for all but the smallest systems. For larger systems, parsimonious representations or models for the transition matrix can be desirable (e.g., wanted or needed). In some conventional approaches, a representation based on cumulant expansion can be employed to capture correlations between variables. However, such conventional approaches do not comprise or provide an algorithm for using such a representation in the context of error mitigation. In other conventional approaches, crosstalk may be incorporated in the model to some extent by taking into account pairwise qubit interactions. To capture crosstalk, a conventional approach considers a correlated noise model based on continuous-time Markov processes and proposes a technique to avoid explicit computation of the inverse transition matrix. The noise model in this conventional approach can be concisely represented using only $2n^2$ parameters. A general difficulty associated with matrix inversion across the different traditional approaches can be that the resulting probability vector $\hat{p}$ may be non-physical: the vector could contain negative entries or sum up to a value other than one. There may be various ways to ensure that the estimated probability vector is physical. As an example, it may be possible to model the noise process by a doubly-stochastic matrix that can be obtained using gate-set tomography. Alternatively, it may be possible to use constrained least-squares or maximum-likelihood estimation, or iterative Bayesian unfolding. Some drawbacks to conventional techniques that estimate the probability vector based on constrained optimization, however, can be that such conventional techniques are not expected to scale well with system size.

To overcome these and other problems associated with traditional approaches to error mitigation, the disclosed subject matter can employ techniques for readout-error mitigation of values determined or estimated by a quantum computer that can involve quantum benchmarking. Unlike traditional methods, the techniques of the disclosed subject matter do not estimate probability vectors. Instead, the techniques of the disclosed subject matter (e.g., employed by the RMC 106) can diagonalize the Pauli readout transfer matrix that expresses the transition between Pauli-z components in the system state $\rho$ and their measurement, which can allow the RMC 106 to form unbiased estimates of these components to within statistical uncertainty. The techniques of the disclosed subject matter do not use the A matrix directly, but instead can diagonalize the transfer matrix under the Hadamard transformation. As with all current methods, the disclosed subject matter can operate assuming accurate state preparation for calibration.

With regard to the techniques and methods of the disclosed subject matter, consider a system of n qubits and order the set of Pauli operators such that $P_q$ can denote a unique Pauli operator for $q\in\mathcal{P}:=[0,4^{n-1}]$. The Pauli-z operators can be assigned indices $\mathcal{Z}:=[0,2^{n-1}]$ such that the Pauli string representation ($\{I,Z\}^{\otimes n}$) can be in lexicographical order when read from right to left (e.g., the operator on the first qubit can change fastest). The identity operator can have index zero, and a singleton can be defined as $\mathcal{I}=\{0\}$. Finally, the disclosed subject matter can denote the set of indices corresponding to Pauli-x operators by $\mathcal{X}$.

Any unitary operator U can be expressed in terms of its Pauli transfer matrix $T_U$. Element $i,j \in \mathcal{P}$ of the transfer matrix can be defined as $$T_U(i,j) = \frac{1}{2^n} Tr(P_i(UP_jU^\dagger)), \qquad \text{Eq. (2)}$$

such that $$U\rho U^\dagger = \frac{1}{2^n} \sum_{p,q \in \mathcal{P}} T_U(p,q) Tr[P_q\rho] P_p, \qquad \text{Eq. (3)}$$

for any state ρ. Given the initial state $$\rho_0 = |0\rangle\langle 0| = 2^{-n}(I + \sigma_z)^{\otimes n} = 2^{-n} \sum_{j \in \mathcal{I}} P_j, \qquad \text{Eq. (4)}$$

there can be an interest in measuring two quantities. The first quantity can estimate the Pauli-z component $P_i$ in the final state $\rho = U\rho_0 U^\dagger$, namely $$Tr(P_i\rho) = \sum_{j \in \mathcal{I}} T_U(i,j). \qquad \text{Eq. (5)}$$

The second quantity can consider an individual element of the Pauli transfer matrix $T_U(i,j)$ with indices $i,j \in \mathcal{Z}$. Throughout it can be assumed that all measurements are done in the computational basis and that the initial state can be as given in Eq. (4). This can mean that only Pauli-z components can be accessed in Eq. (2) and Eq. (5). In order to access other components unitary U can be augmented with appropriate basis changes, if and as desired (e.g., wanted or needed).

With further regard to basis changes, it is noted that basis changes can be performed by applying certain gates to a circuit, wherein a last part of the circuit can be, for a first setting, (1) basis change B, (2) apply Pauli gate $P_q$, and (3) a readout value (e.g., a readout estimation). When the basis change B is a Clifford operator, which can be a typical case, applying basis change B, followed by Pauli gate $P_q$ can be equivalent to applying some Pauli gate $P_s$ followed by basis change B. Given Pauli gate $P_q$, Pauli gate $P_s$ can be efficiently determined. This can mean that the following second setting can be equivalent to the first setting, with the second setting being: (1) apply Pauli $P_s$, (2) basis change B, and (3) a readout value. Given either Pauli gate $P_q$ or Pauli gate $P_s$, the corresponding Pauli gate $P_s$ or Pauli gate $P_q$, respectively, can be determined or computed based on basis change B. In a same or similar manner, this also can apply to an initial state such that a Pauli gate (e.g., a random Pauli gate) followed by a circuit of interest can be equivalent to a first part of some circuit of interest (e.g., a Clifford operator) followed by a Pauli gate and a second part of the circuit of interest. The disclosed subject matter can include an indicated or applied setting (e.g., circuit setting or arrangement) involving a basis change as well as any and all equivalent types of settings involving the basis change.

With further regard to the estimation protocol of the disclosed subject matter, in order to estimate the quantities of interest, the RMC 106 can run (e.g., execute) various instances of the circuit 200 of FIG. 2. The circuit 200 can be parameterized by Pauli indices p and q, and operator C (or the circuit C that can implement the operator C). It can be assumed that identity operators can be rendered less complex, which can result in the circuit 300 of FIG. 3 and the circuit 400 of FIG. 4, as more fully described herein. The general procedure for acquiring data (e.g., Protocol Acquire Data) can be as follows:

Protocol AcquireData($\mathcal{S}_p$, $\mathcal{S}_q$, C, N)
1. Initialize an empty dataset $\mathcal{D}$
2. for i=1, ..., N do
3. Uniformly sample p from $\mathcal{S}_p$
4. Uniformly sample q from $\mathcal{S}_q$
5. Run the circuit in FIG. 2 with parameters p,q and operator C
6. Record measurement m and add (p,q,m) to $\mathcal{D}$
7. return $\mathcal{D}$ Each measurement can be represented as an integer m such that the least-significant bit in the binary representation can correspond to the first qubit and the most-significant bit can correspond to the last qubit. For classical post-processing of the data, a function can be defined as:

$$f(D,i,j) = \frac{1}{|\mathcal{D}|} \sum_{(p,q,m) \in \mathcal{D}} \mu(i,q)\mu(j,p) H_{m,i}, \qquad \text{Eq. (6)}$$

where $\mu(a,b)$ can have the value 1 if Paulis $P_a$ and $P_b$ commute and can have a value of −1 if Paulis $P_a$ and $P_b$ do not commute. The scalar value $H_{m,i}$ can represent the element at row m and column i of the unnormalized Hadamard matrix that can be given by $$H = H_2^{\otimes n} \text{ where } H_2 = \begin{bmatrix} 1 & 1 \\ 1 & -1 \end{bmatrix}, \qquad \text{Eq. (7)}$$

The RMC 106 (e.g., employing the calibration component 108 and estimation component 110) can utilize Protocol 1 for estimating $Tr(P_i\rho)$ in Eq. (5) for Pauli-z operator $i \in \mathcal{Z}$, wherein the Protocol 1 can comprise the following operations:

Protocol 1
1. $\mathcal{D}_0$=AcquireData($\mathcal{D},\mathcal{X},I,N$)
2. $\mathcal{D}_1$=AcquireData($\mathcal{D},\mathcal{X},U,N$)
3. return estimate f($\mathcal{D}_1$,i,0)/f($\mathcal{D}_0$,i,0)

Note that the data acquired by the RMC 106 in operations 1 and 2 (e.g., determining calibration data, $\mathcal{D}_0$, by the calibration component 108, and determining estimation data, $\mathcal{D}_1$, by the estimation component 110) of Protocol 1 can be reused by the RMC 106 to evaluate the quantity in operation 3 (e.g., the return estimate operation) of Protocol 1 for different values of $i,j \in \mathcal{Z}$. In some embodiments, to reduce complexity, the RMC 106 can set the number of samples (e.g., sampling of Pauli operators) in each of the two datasets to N, wherein N can be a desired integer number. In other embodiments, the RMC 106 can use or choose to use different numbers of samples for each or some of these operations of Protocol 1. The estimation of $T_U(i,j)$ in Eq. (2) for any $i,j \in \mathcal{Z}$ (e.g., as determined by the estimation component 110) can follow a similar approach and can be given by Protocol 2 as follows:

Protocol 2
1. $\mathcal{D}_0$=AcquireData($\mathcal{I}, \mathcal{X}$,I,N)
2. $\mathcal{D}_2$=AcquireData($\mathcal{X}, \mathcal{X}$,U,N)
3. return estimate f($\mathcal{D}_2$,i,j)/f($\mathcal{D}_0$,i,0)

As before, the data (e.g.,) from operations 1 and 2 (e.g., determining calibration data, $\mathcal{D}_0$, by the calibration component 108, and determining estimation data, $\mathcal{D}_2$, by the estimation component 110) can be reused (e.g., by the estimation component 110 or other component of the RMC 106) to evaluate $T_U(i,j)$ for various $i,j \in \mathcal{Z}$ in operation 3 (e.g., return estimate operation of Protocol 2). Since the data acquired in operation 1 can be independent of the choice of U, it can be shared for both protocols (e.g., Protocol 1 and Protocol 2) and can be reused (e.g., by the RMC 106) for different operators U. As more fully described herein, it can or may be beneficial to replace parameters $\mathcal{X}$ by $\mathcal{P}$ in the data acquisition in some cases.

With regard to derivation of various aspects and features of the disclosed subject matter, starting with some notation, 1 can denote the vector of all ones of appropriate size, and $e_i$ can denote the i-th column of the identity matrix I, and accordingly, the i-th column of Hadamard matrix H can be expressed as $h_i$=$He_i$. Further note that H can be a symmetric real matrix with inverse $H^{-1}=2^{-n}H$. It follows from the disclosed ordering of the Pauli operators that the top-left $2^n$-by-$2^n$ block of the Pauli transfer matrix $T_U$ can contain the transfer coefficients between the Pauli-z operators, and this matrix can be denoted by $\mathcal{T}_U$. Next, the function Z that maps density operator ρ can be defined to a vector of length $2^n$ containing the weights of each Pauli-z operator:

$$Z(\rho) = \Sigma_i Tr[P_i \rho] e_i.$$

The disclosed subject matter can use an unscaled trace, which can mean that $Z(\rho_0)$=1 for the initial state ρ0. Applying Z to the conjugation of $\rho_0$ with operator U can satisfy $Z(U\rho_0 U^\dagger)=\mathcal{T}_U Z(\rho_0)$. The chosen Pauli ordering of the disclosed subject matter also can allow concisely writing of the measurement probability vector corresponding to state ρ as $p=H^{-1}Z(\rho)$. The disclosed subject matter (e.g., RMC 106 or other component of the disclosed subject matter) can model measurement errors by applying the transition matrix A, which can give effective probabilities $\tilde{p}=AH^{-1}Z(\rho)$. The disclosed subject matter also will describe herein how to deal with more general readout errors.

In order to see the effect of adding random Pauli operators, define the vector $d_q = \Sigma_{i \in \mathcal{Z}} \mu(i,q) e_i$ of commutation values and corresponding diagonal matrix $D_q = \text{diag}(d_q)$. It holds that $Z(P_q \rho P_q) = D_q Z(\rho)$, and based on properties of the Pauli-x subgroup, $$\mathbb{E}_{p \in \mathcal{X}}[\mu(i,p) d_p] = \mathbb{E}_{p \in \mathcal{X}}[\mu(i,p) D_p Z(\rho_0)] = e_i$$

for any $i \in \mathcal{Z}$. The Pauli $P_p$ term combined with the scalar μ(i,p) therefore can allow, on average, the zeroing out of all but one of the Pauli-z terms in $\rho_0$. The circuit 200 in FIG. 2 with C=U and Pauli matrices $P_p$ and $P_q$ can have a noisy measurement probability vector that can be written as $$\tilde{p}_U(p,q) = AH^{-1} D_q \mathcal{T}_U D_p Z(\rho_0)$$

Denote $M=HAH^{-1}$ and define the function $$f_{U,p}(i,j) = \mathbb{E}_q[\mu(i,q)\mu(j,p) h_i^T \tilde{p}_U(p,q)]$$
$$= \mathbb{E}_q[\mu(i,q)\mu(j,p) e_i^T HAH^{-1} D_q \mathcal{T}_U D_p Z(\rho_0)]$$
$$= \mu(j,p) e_i^T M \text{diag}(\mathbb{E}_{q \in \mathcal{X}}[\mu(i,q) d_q]) \mathcal{T}_U D_p 1$$
$$= \mu(j,p) M_{i,i} \mathcal{T}_U D_p 1.$$

In accordance with the disclosed subject matter, p=0 can be fixed, which can give $P_p$=I, and define $$f_U(i) := f_{U,0}(i, \cdot) = M_{i,i} \mathcal{T}_U 1 = M_{i,i} \Sigma_j \mathcal{T}_U(i,j). \quad \text{Eq. (8)}$$

Alternatively, the expectation can be taken over $p \in \mathcal{X}$:

$$f_U(i,j) := \mathbb{E}_{p \in \mathcal{X}}[f_U(i,j)] = M_{i,i} \mathcal{T}_U(i,j)$$

The transfer matrix for the identity operator I can be given by $\mathcal{T}_I(i,j) = \delta_{i,j}$, and it can follow that $f_I(i) = M_{i,i}$. The disclosed subject matter (e.g., RMC 106 or another component) can respectively obtain (e.g., determine or calculate) the readout-error mitigated values for Eq. (5) and Eq. (2) using scalar division, for example, using Eq. (9) as follows:

$$\frac{f_U(i)}{f_I(i)} = \Sigma_j \mathcal{T}_U(i,j) \text{ and } \frac{f_U(i,j)}{f_I(i)} = \mathcal{T}_U(i,j), \quad \text{Eq. (9)}$$

whenever $M_{i,i} \neq 0$.

For a more general treatment, Z can be replaced by a function C that can extract all Pauli coefficients. The restricted transfer matrix $\mathcal{T}_U$ can be replaced by the full transfer matrix $T_U$. Ideal noise-free measurements can be obtained (e.g., by the RMC 106 or other component of the disclosed subject matter) by applying a $2^n$-by-$4^n$ linear map with first $2^n$ columns contain the Hadamard matrix, and the remaining entries can be zero. In the general setting it can be envisaged that $Tr(P_k \rho_o) \neq 0$ for some $k \in \mathcal{P} \setminus \mathcal{Z}$. Similarly, it can or may be that the measurements potentially can be affected by terms that are not in the Pauli-z group. By (e.g., the RMC 106) adding randomly sampled operators from a Pauli subgroup $\mathcal{S}$, it can be seen that, on average, the disclosed subject matter can filter out all Pauli terms that do not commute with all elements in $\mathcal{S}$. In the specific case where $\mathcal{S}$ corresponds to the Pauli-z group that can mean that the disclosed subject matter (e.g., RMC 106) can filter out all terms outside this group, since it is a maximally commuting subgroup. For the initial state, the RMC 106 can therefore multiply $P_p$ with a random Pauli-z matrix. This can be equivalent to sampling p from $\mathcal{P}$ rather than $\mathcal{X}$. Likewise, the disclosed subject matter (e.g., RMC 106) can filter out all terms that are not in the Pauli-z group by sampling q from $\mathcal{P}$. After this, the disclosed subject matter can express the noisy measurement operator as $AH^{-1}\Lambda$, where Λ is a quantum noise channel. This can be equivalent to $(AH^{-1}\Lambda H)$ $H^{-1}=A'H^{-1}$, which thus can allow the disclosed subject matter (e.g., RMC 106) to model quantum noise as a classical noise channel.

The goal of Protocols 1 and 2 can be to estimate the quantities in Eq. (9). If these quantities are written in the form $\mathcal{X}/\mathcal{Y}$, it can be seen that the protocols employed by the RMC 106 can work by generating estimates $\hat{x}$ and $\hat{y}$ and returning $\hat{x}/\hat{y}$. The sample complexity of the protocols can now be considered. That is, what value of N the disclosed subject matter (e.g., the RMC 106) can choose, such that with probability at least 1-δ the final estimate can deviate at most ϵ from the exact value. Before doing so, the accuracy of the estimate can be considered in the case $\mathcal{X}$ and $\mathcal{Y}$ can be estimated up to an error of at most α.

Lemma IV.1. Let $\mathcal{X},\mathcal{Y}$ be such that $0 \le |\mathcal{X}| \le |\mathcal{Y}| \le 1$. Given estimates $\hat{x}, \hat{y}$ with $|\mathcal{X} - \hat{x}| \le \alpha$ and $|\mathcal{Y} - \hat{y}| \le \alpha$, such that $0 \le \alpha \le |\mathcal{Y}|/2$. Then $$\left| \frac{\hat{x}}{\hat{y}} - \frac{x}{y} \right| \le \frac{4\alpha}{y}.$$

Proof. Assume without loss of generality that $\mathcal{X},\mathcal{Y} \ge 0$. Taking the Taylor-series expansion around zero for sufficiently small α, it can be seen in the worst case that $$\frac{\hat{x}}{\hat{y}} = \frac{x+\alpha}{y-\alpha} = \frac{x}{y} + \left(1 + \frac{x}{y}\right) \sum_{k=1}^{\infty} \left(\frac{\alpha}{y}\right)^k \le$$

$$\frac{x}{y} + \left(1 + \frac{x}{y}\right) \cdot \left(\frac{1}{1-\alpha/y} - 1\right) \le \frac{x}{y} + \left(1 + \frac{x}{y}\right) \cdot \left(\frac{\alpha/y}{1-\alpha/y}\right) \le \frac{x}{y} + \frac{4\alpha}{y}.$$

In the last inequality, the disclosed subject matter can use the fact that $\mathcal{X}/\mathcal{Y} \le 1$, and $1-\alpha/\mathcal{Y} \ge 1/2$. The disclosed subject matter (e.g., RMC 106 or other component) can derive a lower bound similarly to obtain the given result.

With this the disclosed subject matter can obtain the following sample complexity: Theorem IV.2. With probability at least 1-δ, Protocols 1 and 2 (e.g., RMC 106 employing Protocols 1 and 2) respectively can estimate Eq. (5) and Eq. (2) with error at most ϵ for a fixed $i,j \in \mathcal{Z}$ when the number of samples N satisfies $$N \ge \frac{32\log(4/\delta)}{M_{i,i}^2 \epsilon^2}.$$

Proof. Protocols 1 and 2 can acquire data and estimate different quantities using the function in Eq. (6). For a fixed i and j, each term in the summation can be viewed as an independent ±1 sample from a certain distribution depending on U that can marginalize over Pauli indices p and q. For the error in the estimated quantities, Hoeffding's inequality can be applied by the disclosed subject matter, wherein Hoeffding's inequality states that, given independent random variables $X_i$ from any distribution over $[-1, 1]$, the deviation of $\bar{X}=N^{-1}\sum_{i=1}^{N} X_i$ to the expected value $\mathbb{E}(X)$ satisfies $$Pr(|\bar{X}- \mathbb{E}(X)| \ge \alpha) \le 2\exp(-\tfrac{1}{2}N\alpha^2) \quad \text{Eq. (10)}$$

It can be desirable (e.g., wanted) to ensure that the probability of deviating from the expectation by α or more, is bounded by δ/2. Using the union bound it can follow that the enumerator and denominator are α close to their expectation with probability at least 1-δ. Bounding the failure probability in Eq. (10) from above by δ/2 gives the sufficient condition $$N \ge \frac{2\log(4/\delta)}{\alpha^2}. \quad \text{Eq. (11)}$$

The disclosed subject matter can choose (e.g., select) α such that the final estimate can be ϵ accurate. From Lemma IV.1 it can be seen that it can suffice to take $4\alpha/\mathcal{Y} \le \epsilon$, where $\mathcal{Y} = f_i(i) = M_{i,i}$. Substituting $\alpha = \epsilon M_{i,i}/4$ Eq. (11) can give the desired result.

Figure 5:
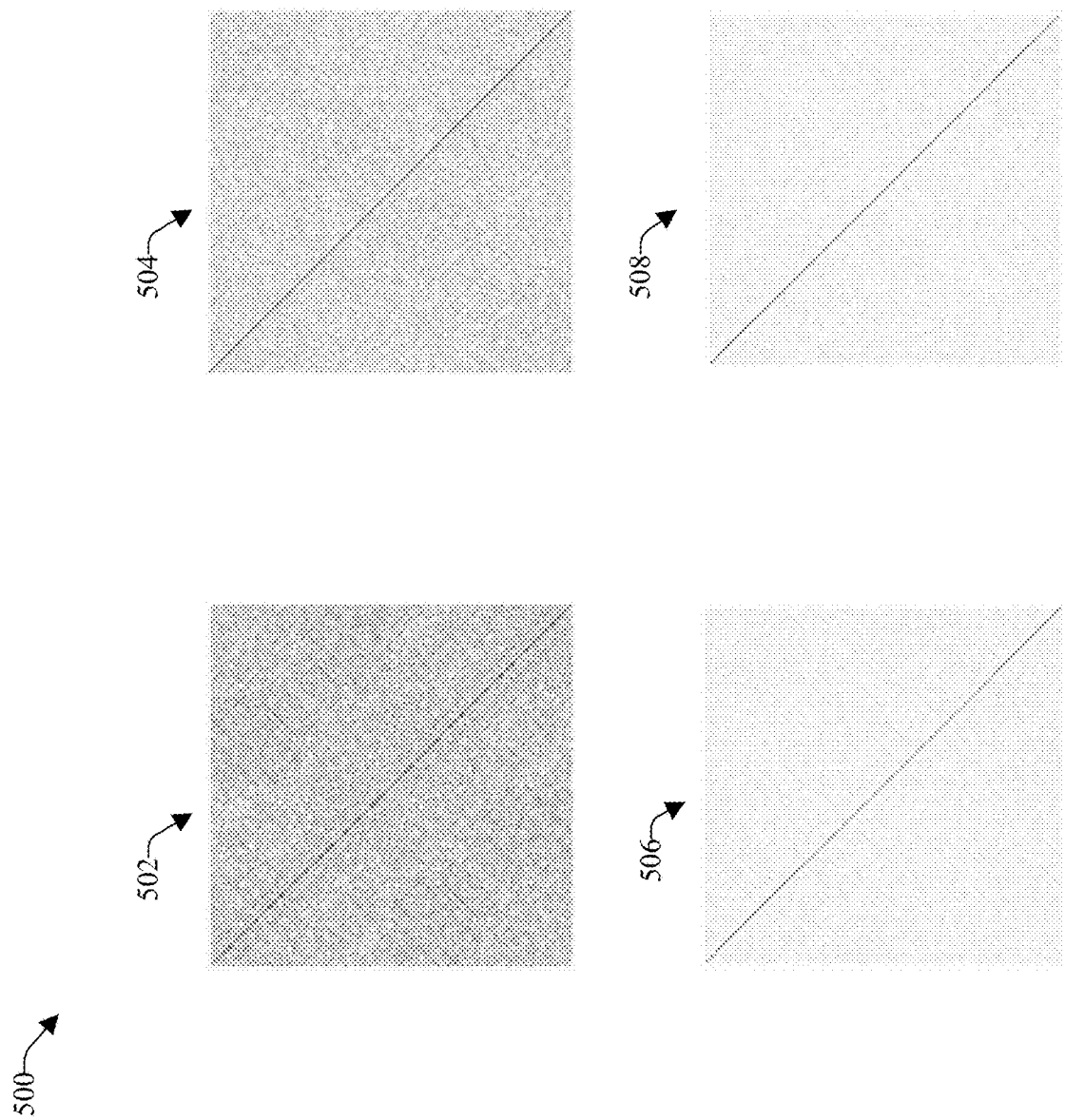
FIG. 5 depicts a diagram of example diagonalization masks for 12 qubits, obtained by averaging the outer products of commutation vectors $d_q$ using respective numbers of random $q \in \mathcal{X}$, in accordance with various aspects and embodiments of the disclosed subject matter.

With regard to the number of circuit instances, for a given q, the term $D_q M D_q$ can be written as the elementwise product of M and the outer product $d_q d_q^T$. The outer product has the significant property that diagonal elements are always one, irrespective of the signs in $d_q$. For randomly sampled $q \in \mathcal{X}$ or $q \in \mathcal{P}$, each off-diagonal value can have an equal chance of being plus or minus one, and therefore can have an expected value of zero. When the number of qubits n is small the disclosed subject matter (e.g., RMC 106 or another component) can iterate over all possible q values and obtain exact diagonalization of M. For larger values of n this can become intractable and the disclosed subject matter can therefore only approximately diagonalize M, as illustrated in FIG. 5. FIG. 5 is a diagram of example diagonalization masks 500 for 12 qubits, obtained by averaging the outer products of commutation vectors $d_q$ using respective numbers of random $q \in \mathcal{X}$, in accordance with various aspects and embodiments of the disclosed subject matter. The diagonalization masks 500 can comprise diagonalization mask 502 for 12 qubits, obtained by averaging the outer products of commutation vectors $d_q$ using 30 random $q \in \mathcal{X}$; diagonalization mask 504 for 12 qubits, obtained by averaging the outer products of commutation vectors $d_q$ using 100 random $q \in \mathcal{X}$; diagonalization mask 506 for 12 qubits, obtained by averaging the outer products of commutation vectors $d_q$ using 1000 random $q \in \mathcal{X}$; and diagonalization mask 508 for 12 qubits, obtained by averaging the outer products of commutation vectors $d_q$ using 3000 random $q \in \mathcal{X}$. For calibration the disclosed subject matter (e.g., RMC 106) can estimate $e_i M1 = M_{i,i} + e_i M(1-e_i)$. In order to suppress the second term, it can be desirable for the RMC 106 to sample sufficiently many circuits instances. For the actual estimate of $M_{i,i}$ itself, it can be desirable for the RMC 106 to sample sufficiently many times regardless of the circuit instance. At this point, it can be noted that the actual procedure can depend on measurements from the probability vector $\tilde{p}=AH^{-1}D_q Z(\rho_0)$, and therefore, it can be desirable (e.g., useful or suitable) for the RMC 106 to sample each circuit sufficiently many times (e.g., sample each circuit a sufficient number of times that can satisfy the defined readout management criteria, such as indicated or described herein by the disclosed subject matter).

The disclosed subject matter can give bounds on the number of circuit instances utilized or desired to estimate $M_{i,i}$ to a given accuracy. Given that the disclosed subject matter can multiply by an approximately diagonal mask, this bound can depend in part on the maximum off-diagonal elements in M The disclosed subject matter can show how this corresponds to properties of the transfer matrix A and these properties can be studied for different types of transfer matrices. When sampling individual elements of $\tau_U$, it can be desirable (e.g., useful or suitable) to approximately zero out all but one of the coefficients in $Z(\rho_0)$. Properties of the Pauli transfer matrix can be studied to determine the extent to which it can be desirable for the disclosed subject matter to shrink these elements. The final estimates (e.g., final estimates of the readout result) can be given by the ratio of two quantities and it therefore can be considered how the estimation error in these quantities can affect the result. Note that, in this part of the disclosed subject matter, the disclosed subject matter can work with the full matrix representation for clarity; and, as shown and elsewhere described in the disclosed subject matter, processing itself can be performed based on individual elements.

For the number of circuit instances the disclosed subject matter can desire to approximately diagonalize M, the disclosed subject matter can have the following result: Theorem IV.3. Given k randomly sampled values $q_1, \ldots, q_k \in \mathcal{X}$ and an index set $\mathcal{I} \subseteq [2^n]$. Define $$\hat{M} = \frac{1}{k}\sum_{\ell=i}^{k}(D_{q\ell}MD_{q\ell}) \text{ and } \beta = \max_{i \in \mathcal{I}}\sum_{j \neq i}|M_{i,j}|.$$

Then satisfy $|e_i\hat{M}(1-e_i)| \leq \epsilon$ and $|\hat{M}_{i,i} - M_{i,i}| \leq \epsilon$ simultaneously for all $i \in \mathcal{I}$ with probability at least $1-\delta$ whenever $$k \geq 2\frac{\log(2/\delta) + n\log(2) + \log(|\mathcal{I}|)}{\epsilon^2/(1+\beta)^2}. \qquad \text{Eq. (12)}$$

Proof. Let i be any element in $\mathcal{I}$. Given independent random variables $X_i$ from any distribution over $[-1, 1]$, it can follow from Hoeffding's inequality that the deviation of $\overline{X} = k^{-1}\sum_{i=1}^{k}X_i$ to the expected value $\mathbb{E}(X)$ satisfies $$Pr(|\overline{X} - \mathbb{E}(X)| \geq \epsilon) \leq 2\exp(-\frac{1}{2}k\epsilon^2). \qquad \text{Eq. (13)}$$

For scaling of the off-diagonal elements, the disclosed subject matter (e.g., RMC 106) can uniformly sample X from $\{-1, 1\}$. If we can ensure that each element is scaled by a factor at most $\epsilon_b$, there can be an additive term with magnitude at most $\epsilon_b\beta$ in the estimation of $M_{i,i}$. For the estimation of $M_{i,i}$ itself, the disclosed subject matter can apply Eq. (13) with X following an appropriate distribution on $[-1, 1]$ and a maximum deviation of $\epsilon_a$. Using a union bound over the off-diagonal elements in the row, the disclosed subject matter can obtain the condition $$2\exp(-\tfrac{1}{2}k\epsilon_a^2) + 2(2^n - 1)\exp(-\tfrac{1}{2}k\epsilon_b^2) \leq \delta \qquad \text{Eq. (14)}$$

In case $\beta = 0$, the disclosed subject matter can choose $\epsilon_a = \epsilon$ and let $\epsilon_b \to \infty$. Using a union bound over the rows in $\mathcal{I}$ can give a sufficient number of circuit instances of $$k \geq \frac{\log(2/\delta) + \log(|\mathcal{I}|)}{\epsilon^2/2}.$$

For the more general case where $\beta \neq 0$, the disclosed subject matter can choose $\epsilon_a = \epsilon_b$, which can reduce the condition of Eq. (14) to $$2^n \exp(-\tfrac{1}{2}k\epsilon_a^2) = \exp(n\log(2) - \tfrac{1}{2}k\epsilon_a^2) \leq \delta/2 \qquad \text{Eq. (15)}$$

In order to satisfy $\epsilon_a + \epsilon_b\beta \leq \epsilon$, the disclosed subject matter can choose $\epsilon_a \leq \epsilon/(1+\beta)$. Combined with a union bound, obtained by multiplying the left-hand side of Eq. (14) by the number of elements in the set or grouping of $\mathcal{I}$, this can give the sample complexity stated in Eq. (12).

As an aside, it is noted that diagonalization of quantum noise channels using Pauli twirls can follow exactly the same principle as the one the disclosed subject matter used for diagonalizing M. The disclosed subject matter (e.g., RMC 106 or other component) can utilize a desired modification of Theorem IV.3 to determine the number of circuits desired (e.g., wanted) to ensure that all off-diagonal noise terms are bounded by $\epsilon$.

With regard to example transition matrices, for a given transition matrix A, the disclosed subject matter can define corresponding transformed matrix $M = HAH^{-1}$ as readout transition matrix for Pauli-z operators. It can be seen that $M^{-1} = HA^{-1}H^{-1}$ whenever the inverse of A exists. For convex combinations of two error channels, namely $A = \mu A_1 + (1-\mu)A_2$ with $\mu \in [0,1]$, the disclosed subject matter can have $M = \mu M_1 + (1-\mu)M_2$. This straightforwardly generalizes to the convex combination of any number of transition matrices.

As a basic example of a transition matrix, consider the case where the outcome of each qubit is independently flipped with some probability r. The transition matrix for a single qubit can be given by Eq. (1) with $r=s$, and combined into a global transition matrix $A = A_{s_1} \otimes A_{s_n}$. The corresponding Pauli readout transition matrix can have a particularly basic structure:

$$HAH^{-1} = \bigotimes_{\ell=1}^{n}(H_2A_{r\ell}H_2^{-1}) = \bigotimes_{\ell=1}^{n}\begin{bmatrix} 1 & 0 \\ 0 & (1-2r_\ell) \end{bmatrix}. \qquad \text{Eq. (16)}$$

In this case, since M is already diagonal, the disclosed subject matter does not have to shrink the off-diagonal elements. It therefore can suffice for the disclosed subject matter to choose an arbitrary but fixed value for $q \in \mathcal{X}$ for the circuits, rather than sample it. Choosing $q=0$ can make the resulting circuits less complex. Assume for simplicity that all probabilities $r\ell$ are equal to r, it can follow from Eq. (16) that the diagonal element $M_{i,i}$ can be directly related to the weight of the Pauli-z operator $P_i$. For each $\sigma_z$ term in $P_i$, the disclosed subject matter can have a multiplicative term $(1-2r)$. The diagonal term for $P_i$ with k non-identity term can be given by $(1-2r)^k$. The term $(1-2r)^k$ can be bounded below by $1-2kr$, which can mean that for 30 qubits with 1% probability of a measurement flip, the diagonal elements in M are still at least 0.4. In the noiseless case, the bit flip probability can be zero and the disclosed subject matter can obtain $A=M=I$.

The transition matrix for the situation where the disclosed subject matter only measure zeros can be given by $A = e_0e^T$ with a corresponding matrix $M = ee_0^T$. In case each outcome is measured with equal probability regardless of the state, the disclosed subject matter can have $A = 2^{-n}ee^T$ and $M = e_0e_0^T$. Although not realistic by themselves, the disclosed subject matter can use these matrices, for example, in convex combinations with other transition matrices. A good, but not very realistic, example of a transition matrix that can be perfectly invertible but can provide some difficulty can be the following permutation matrix:

$$A = \begin{bmatrix} \cdot & \cdot & 1 & \cdot \\ 1 & \cdot & \cdot & \cdot \\ \cdot & \cdot & \cdot & 1 \\ \cdot & 1 & \cdot & \cdot \end{bmatrix}, H^{-1}AH = \begin{bmatrix} 1 & \cdot & \cdot & \cdot \\ \cdot & \cdot & -1 & \cdot \\ \cdot & 1 & \cdot & \cdot \\ \cdot & \cdot & \cdot & -1 \end{bmatrix}.$$

In case information the disclosed subject matter can have an approximate inverse $\hat{A}^{-1}$, the disclosed subject matter can adjust the disclosed scheme to work with $D_q H \hat{A}^{-1} \tilde{p}$ instead of $D_q H \hat{p}$. This form of preconditioning (e.g., by the RMC 106 or other component of the disclosed subject matter) can help increase the magnitude of the diagonal elements in M or reduce that of the off-diagonal elements, but potentially can be computationally expensive.

With regard to some practical considerations, in much of the discussion so far, ideal state preparation has been assumed. Suppose that, instead of $\rho_0 = |0\rangle\langle 0|$, only $\tilde{\rho}_0$ can be prepared. For calibration, this can mean that, after diagonalization of M, the disclosed subject matter can obtain the vector $$(M \odot I) Z(\tilde{\rho}_0) = \text{diag}(Z(\tilde{\rho}_0)) m \qquad \text{Eq. (17)}$$

rather than m. If it is assumed that state preparation for qubits is independent and that each qubit $\ell$ is initialized to state $(1-\alpha_\ell)|0\rangle\langle 0| + \alpha_\ell |1\rangle\langle 1| = \frac{1}{2}(I + (1-2\alpha_\ell)\sigma_z)$, the disclosed subject matter can have $$Z(\tilde{\rho}_0)^T = \bigotimes_\ell \begin{pmatrix} 1 \\ 1 - 2\alpha_\ell \end{pmatrix}.$$

Under this assumption, that can mean that, if the disclosed subject matter can estimate the $\alpha_\ell$ values, the disclosed subject matter (e.g., RMC 106 or other component) can incorporate this information in Eq. (17) to better estimate m. Aside from improving calibration, knowledge of $\tilde{\rho}_0$ also can allow the RMC 106 to better estimate individual elements in the Pauli transfer matrix $\mathcal{T}_U$. For Pauli observables, however, the disclosed subject matter can at best obtain a readout-error free estimate of $$\mathcal{T}_U Z(\tilde{\rho}_0)$$

due to the mixing of terms by $\mathcal{T}_U$. In case $\mathcal{T}_U$ is diagonal, for instance in benchmarking settings, there is no mixing, and readout-error correction can simultaneously take care of state preparation errors without knowledge of $\tilde{\rho}$.

Once the RMC 106 (e.g., calibration component 108 of the RMC 106) has acquired the calibration data set, the RMC 106 can utilize the calibration data to mitigate readout errors for circuits with various U, potentially with basis changes. In practical systems, gradual changes in systemic gate and readout errors can be expected. That can mean that calibration data can have a limited lifetime. For error mitigation in the disclosed approach, the RMC 106 can traverse the calibration data, for example, whenever the RMC 106 is to be used to compute the correction factor for an individual Pauli-z operator. This approach by the RMC 106 can make updates to the calibration data set desirably light weight (e.g., very light weight): the calibration component 108 can readily augment the calibration data with time stamps and periodically add some new data points (e.g., calibration data points) while retiring (e.g., removing, discarding, deleting, or discontinuing the use of) data that falls outside a desired time window (e.g., a current time window), in accordance with the defined readout management criteria. For approaches based on explicit inversion of the transfer matrix, any such update by the calibration component 108 can amount to regeneration of the entire matrix and its inverse. The computation complexity for the calibration component 108 updating the correction factor using Eq. (6) can be linear in the size of the data set. The evaluation of an element in the Hadamard matrix and commutation between two n-qubit Pauli operators by the RMC 106 both can take $\mathcal{O}(n)$ time.

As disclosed herein, the disclosed subject matter typically can only access information about M by sampling from $\tilde{p} = AH^{-1} D_q Z(\rho_0)$ for each instance q. In practice, the disclosed subject matter can therefore make a tradeoff between the number of circuit instances and the number of samples per circuit, in accordance with the defined readout management criteria.

The disclosed subject matter (e.g., RMC 106), by employing the techniques and estimation protocols described herein to facilitate estimating readout results, can have a number of advantages over conventional estimation techniques for quantum readout results. The techniques and protocols of the disclosed subject matter can be more efficient and more accurate in estimating readout results, and can more desirably mitigate (e.g., reduce or minimize) error in the estimation of Pauli observables. Unlike conventional techniques, the techniques and protocols of the disclosed subject matter do not have to have any a priori assumptions or model of the readout-error process. The techniques and protocols of the disclosed subject matter can be based on the augmentation of quantum circuits with randomly selected Pauli operators and the evaluation of a scalar function based on the measurements obtained using a series of random instances. The disclosed subject matter can desirably mitigate readout errors by dividing the function value for the quantum circuit of interest by the function value of the benchmark circuit (e.g., calibration circuit). The techniques and protocols of the disclosed subject matter (e.g., as utilized by the RMC 106) can work by diagonalizing the readout-error transfer matrix in the Hadamard domain, which can make it relatively trivial to invert. In contrast to many of the conventional algorithms, the techniques and protocols of the disclosed subject matter (e.g., as utilized by the RMC 106) can directly estimate the weight of the Pauli-z components in the state (or elements of the Pauli transfer matrix), rather than the distribution of the distribution of measurement values. Simulations of the implementation of the techniques and protocols of the disclosed subject matter demonstrate that such techniques and protocols can be capable of mitigating correlated readout error in a twelve-qubit system with relatively few (e.g., very few) measurements and circuit instances.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 6:
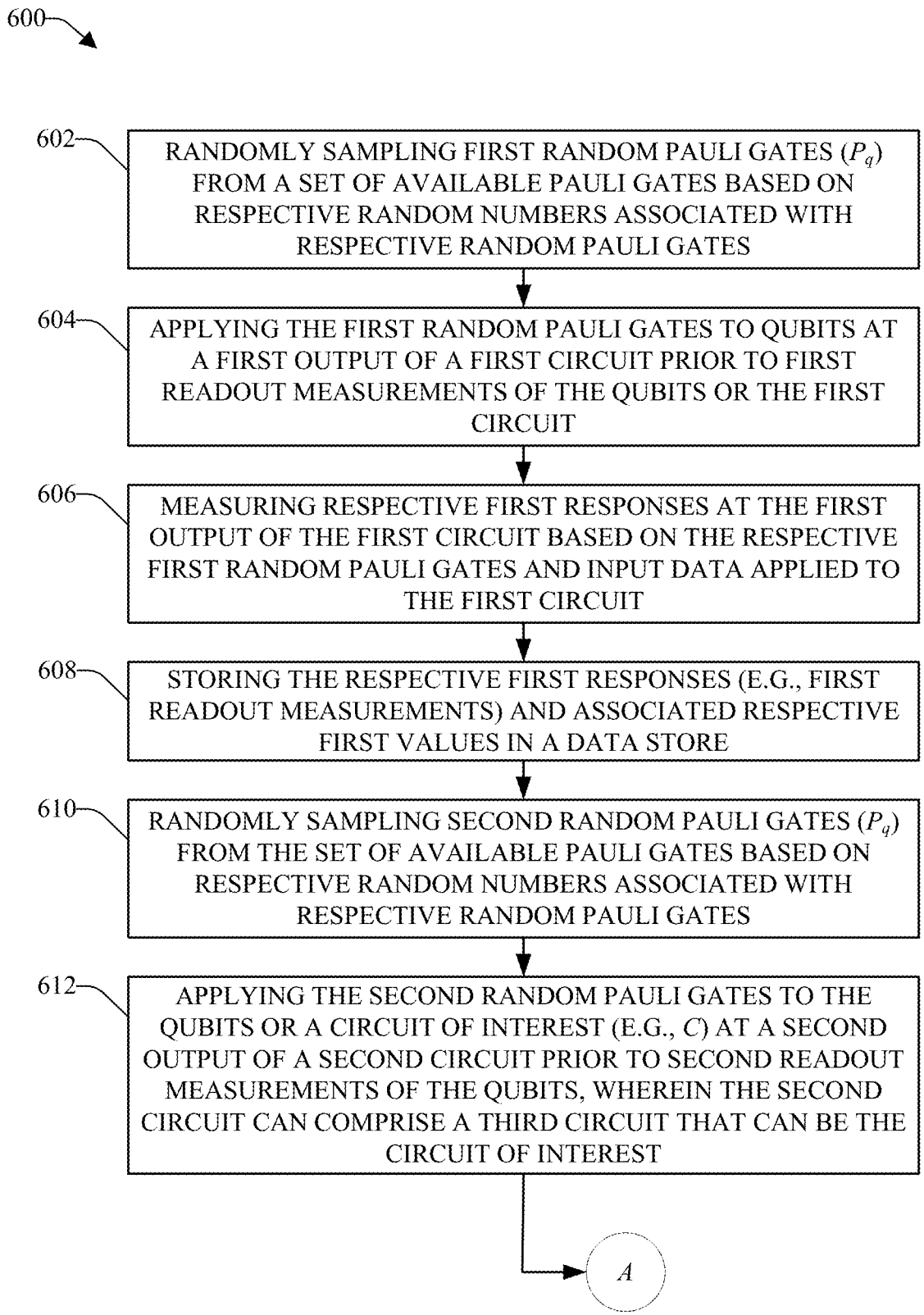
FIGS. 6 and 7 illustrate a flow diagram of an example, non-limiting method that can desirably mitigate readout error associated with readout results produced by a quantum computer, in accordance with various aspects and embodiments of the disclosed subject matter.
Figure 7:
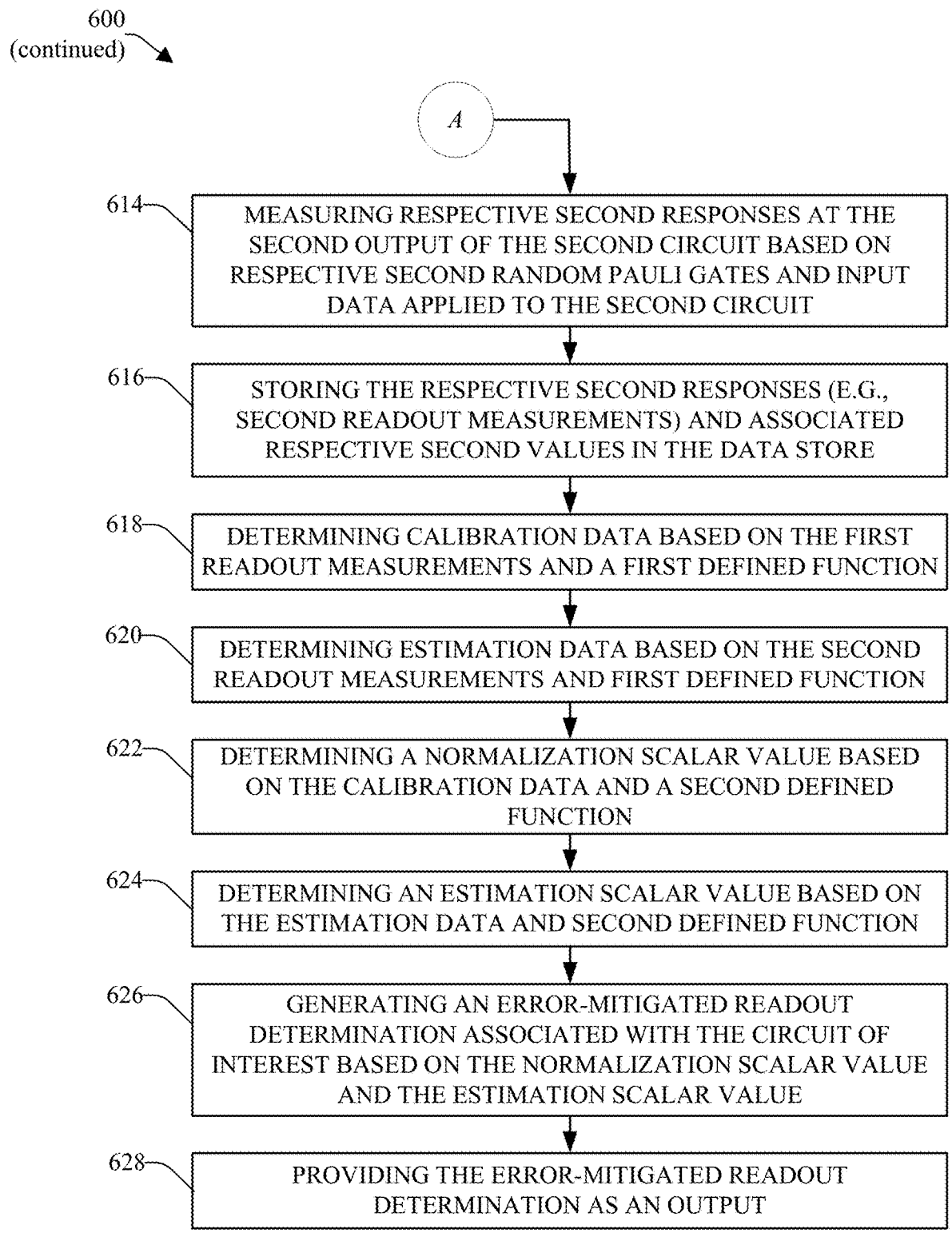

FIGS. 6 and 7 illustrate a flow diagram of an example, non-limiting method 600 that can desirably mitigate readout error associated with readout results produced by a quantum computer, in accordance with various aspects and embodiments of the disclosed subject matter. In some embodiments, the method 600 can be performed by, for example, the RMC and/or a processor component, which can be associated with a data store. The RMC can comprise a calibration component, estimation component, and/or other components (e.g., other constituent components), such as described herein. The RMC can be associated with the quantum computer, and can receive readout determinations (e.g., readout results) from circuits (e.g., quantum circuits) that can be formed using components (e.g., quantum components), including qubits, and circuitry (e.g., quantum circuitry) of the quantum computer. Repetitive description of like elements employed in other embodiments described herein is or may be omitted for sake of brevity.

At 602, first random Pauli gates ($P_q$) can be randomly sampled from a set of available Pauli gates based on respective random numbers (e.g., randomly generated numbers) associated with respective random Pauli gates. The RMC can employ an RNG to generate the random numbers, wherein respective numbers can be associated with (e.g., linked or mapped to) respective Pauli gates, and wherein information relating to the associating (e.g., linking or mapping) of respective numbers with (or to) respective Pauli gates can be stored in, and retrieved from, the data store to facilitate determining which Pauli gate is associated with which number. At 604, the first random Pauli gates can be applied to qubits at a first output of a first circuit (e.g., circuit 400 of FIG. 4) prior to first readout measurements of the qubits or the first circuit. At 606, respective first responses at the first output of the first circuit (e.g., applied to initial state $|0\rangle$) can be measured based on the respective first random Pauli gates and input data applied to the first circuit. The first responses can be the first readout measurements. The calibration component can perform one or more readout measurements (e.g., one or more first readout measurements) for each of the first random Pauli gates. At 608, the respective first responses (e.g., first readout measurements) and associated respective first values can be stored in a data store, wherein the respective first values can be associated with the respective first readout measurements (e.g., respective first readout measurement values) and the respective first random Pauli gates. The respective first values can correspond to the respective random numbers used to determine and select the respective first random Pauli gates.

At 610, second random Pauli gates ($P_q$) can be randomly sampled from the set of available Pauli gates based on respective random numbers associated with respective random Pauli gates. At 612, the second random Pauli gates can be applied to the qubits or a circuit of interest (e.g., C) at a second output of a second circuit (e.g., circuit 300 of FIG. 3) prior to second readout measurements of the qubits, wherein the second circuit can comprise a third circuit that can be the circuit of interest. At this point, the method 600 can proceed to reference point A, wherein, as shown in FIG. 7, the method 600 can proceed from reference point A to reference numeral 614.

At 614, respective second responses at the second output of the second circuit can be measured based on respective second random Pauli gates and input data applied to the second circuit. The respective second responses can be the respective second readout measurements. At 616, the respective second responses (e.g., second readout measurements) and associated respective second values can be stored in the data store, wherein the respective second values can be associated with the respective second readout measurements (e.g., respective second readout measurement values) and the respective second random Pauli gates. The respective second values can correspond to the respective random numbers used to determine and select the respective second random Pauli gates.

At 618, calibration data can be determined based on (e.g., as a function of) the first readout measurements measured at the first output of the first circuit and a first defined function, such as more fully described herein. At 620, estimation data can be determined based on the second readout measurements measured at the second output of the second circuit and the first defined function, such as more fully described herein.

At 622, a normalization scalar value can be determined based on (e.g., as a function of) the calibration data and a second defined function. At 624, an estimation scalar value can be determined based on the estimation data and the second defined function, such as more fully described herein. At 626, an error-mitigated readout determination associated with the circuit of interest can be generated based on (e.g., as a function of) the normalization scalar value and the estimation scalar value (e.g., the estimation scalar value divided by the normalization scalar value), as more fully described herein. The error-mitigated readout determination can be an estimated (e.g., an unbiased estimation of) or expected readout result (e.g., a readout result determined and generated by the quantum computer and processed by the RMC) that can have readout error desirably mitigated (e.g., reduced or minimized). At 628, the error-mitigated readout determination can be provided (e.g., communicated or produced) as an output (e.g., output from the RMC associated with the quantum computer).

Figure 8:
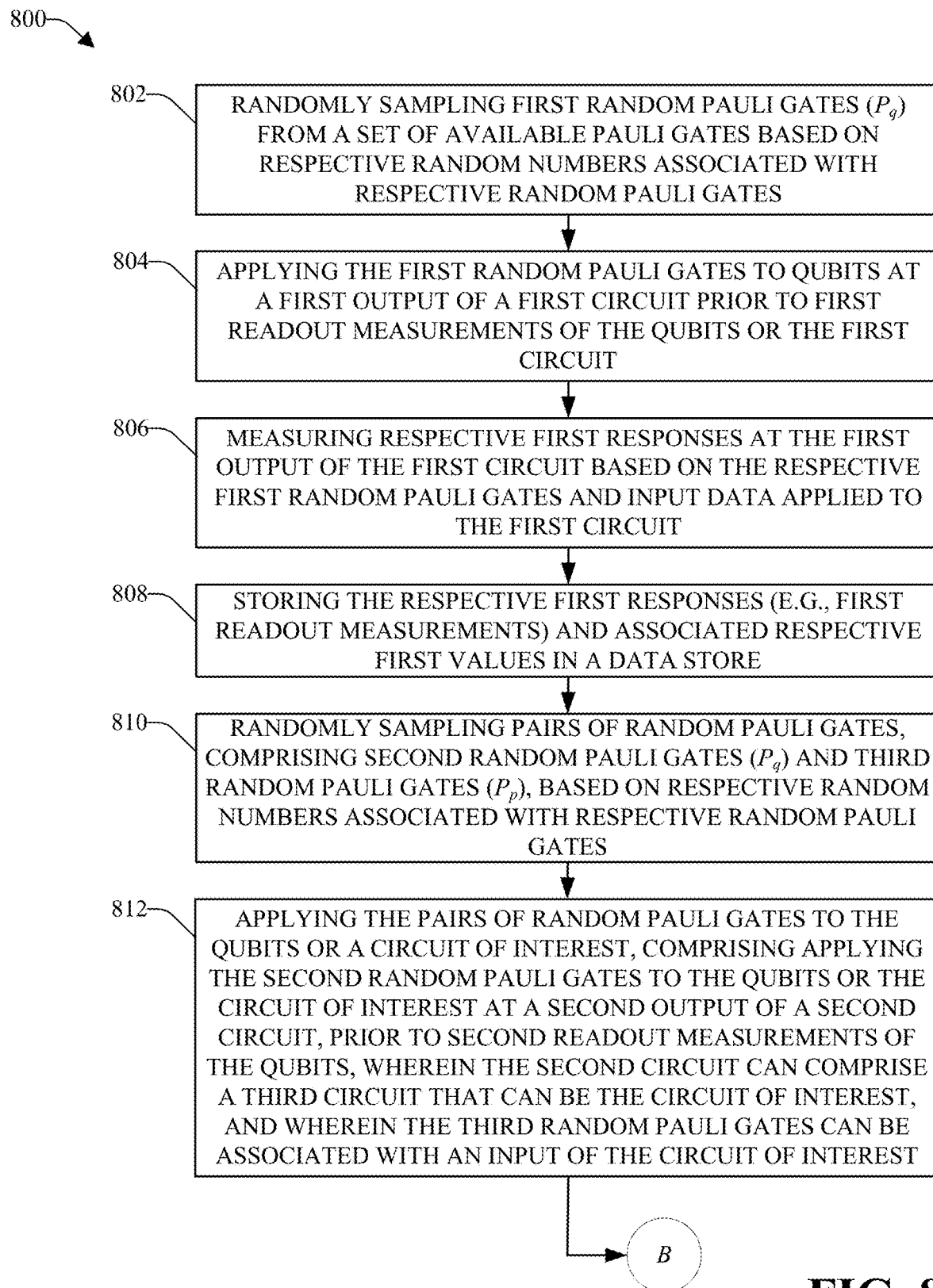
FIGS. 8 and 9 depict a flow diagram of another example, non-limiting method that can desirably mitigate readout error associated with readout results produced by a quantum computer, in accordance with various aspects and embodiments of the disclosed subject matter.
Figure 9:
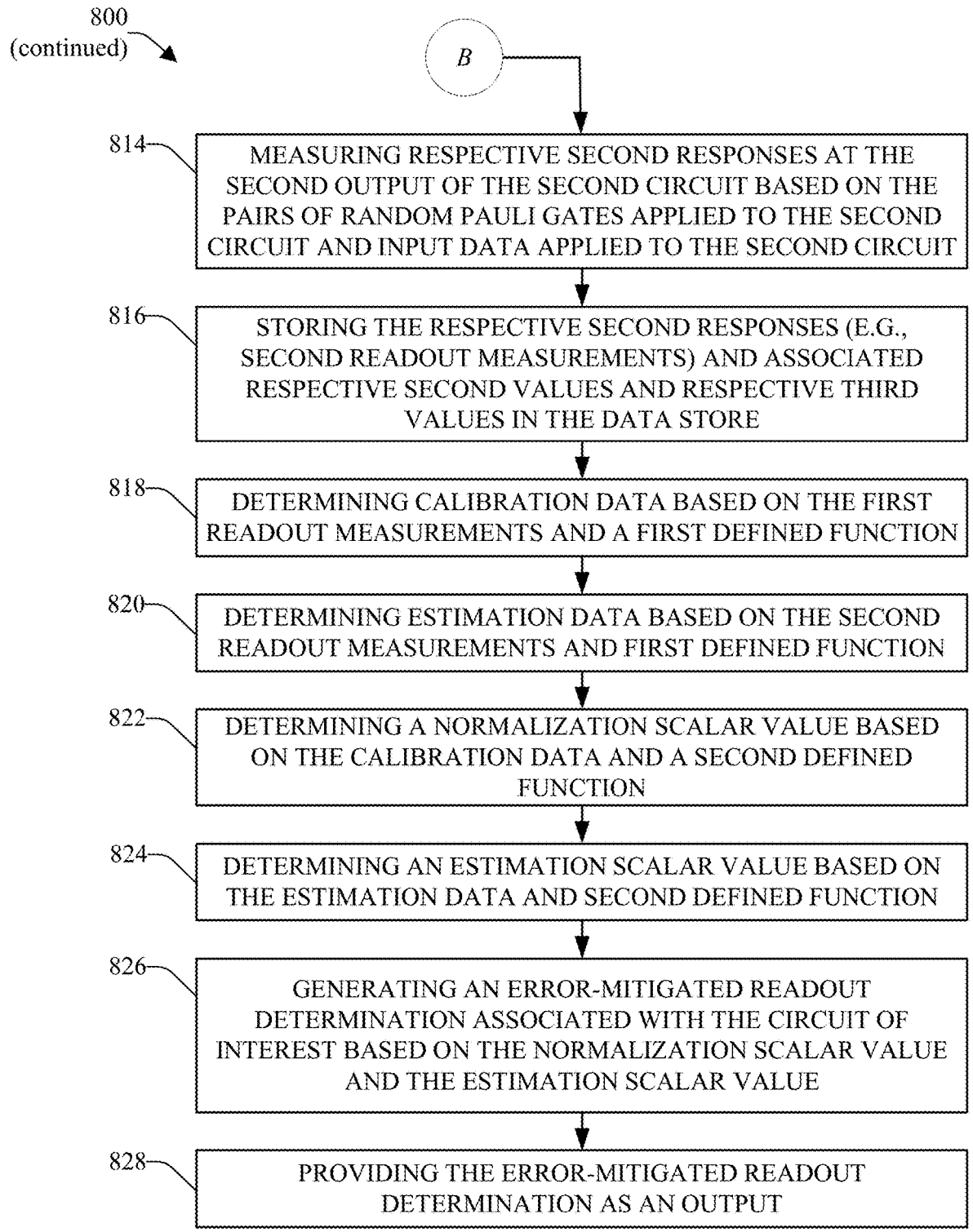

FIGS. 8 and 9 depict a flow diagram of another example, non-limiting method 800 that can desirably mitigate readout error associated with readout results produced by a quantum computer, in accordance with various aspects and embodiments of the disclosed subject matter. The method 800 can be performed by, for example, the RMC and/or a processor component, which can be associated with a data store. The RMC can comprise a calibration component, estimation component, and/or other components (e.g., other constituent components), such as described herein. The RMC can be associated with the quantum computer, and can receive readout determinations (e.g., readout results) from circuits (e.g., quantum circuits) that can be formed using components (e.g., quantum components), including qubits, and circuitry (e.g., quantum circuitry) of the quantum computer. Repetitive description of like elements employed in other embodiments described herein is or may be omitted for sake of brevity.

At 802, first random Pauli gates ($P_q$) can be randomly sampled from a set of available Pauli gates based on respective random numbers (e.g., randomly generated numbers) associated with respective random Pauli gates. The RMC can employ an RNG to generate the random numbers, wherein respective numbers can be associated with (e.g., linked or mapped to) the respective Pauli gates, and wherein information relating to the associating (e.g., linking or mapping) of respective numbers with (or to) the respective Pauli gates can be stored in, and retrieved from, the data store to facilitate determining which Pauli gate is associated with which number. At 804, the first random Pauli gates can be applied to qubits at a first output of a first circuit (e.g., circuit 400) prior to first readout measurements of the qubits or the first circuit. At 806, respective first responses at the first output of the first circuit (e.g., applied to initial state $|0\rangle$) can be measured based on the respective first random Pauli gates and input data applied to the first circuit. The first responses can be the first readout measurements. The calibration component can perform one or more readout measurements (e.g., one or more first readout measurements) for each of the first random Pauli gates. At 808, the respective first responses (e.g., first readout measurements) and associated respective first values can be stored in a data store, wherein the respective first values can be associated with the respective first readout measurements and the respective first random Pauli gates. The respective first values can correspond to the respective random numbers used to determine or select the respective first random Pauli gates.

At 810, pairs of random Pauli gates, comprising second random Pauli gates ($P_q$) and third random Pauli gates ($P_p$), can be randomly sampled based on respective random numbers (e.g., randomly generated numbers) associated with respective random Pauli gates. At 812, the pairs of random Pauli gates can be applied to the qubits or a circuit of interest (C), comprising applying the second random Pauli gates to the qubits or the circuit of interest at a second output of a second circuit (e.g., circuit 200), prior to second readout measurements of the qubits, wherein the second circuit can comprise a third circuit that can be the circuit of interest, and wherein the third random Pauli gates can be associated with an input of the circuit of interest. At this point, the method 800 can proceed to reference point B, wherein, as shown in FIG. 9, the method 800 can proceed from reference point B to reference numeral 814.

At 814, respective second responses at the second output of the second circuit can be measured based on the pairs of random Pauli gates applied to the second circuit and input data applied to the second circuit. The respective second responses can be the respective second readout measurements. At 816, the respective second responses (e.g., second readout measurements) and associated respective second values and respective third values can be stored in the data store, wherein the respective second values and the respective third values can be associated with (e.g., linked, mapped, or appended to) the respective second readout measurements, wherein the respective second values can be associated with the second random Pauli gates, and wherein the respective third values can be associated with the third random Pauli gates.

At 818, calibration data can be determined based on (e.g., as a function of) the first readout measurements measured at the first output of the first circuit and a first defined function, such as more fully described herein. At 820, estimation data can be determined based on the second readout measurements measured at the second output of the second circuit and the first defined function, such as more fully described herein.

At 822, a normalization scalar value can be determined based on (e.g., as a function of) the calibration data and a second defined function, such as more fully described herein. At 824, an estimation scalar value can be determined based on the estimation data and the second defined function, such as more fully described herein. At 826, an error-mitigated readout determination associated with the circuit of interest can be generated based on (e.g., as a function of) the normalization scalar value and the estimation scalar value (e.g., the estimation scalar value divided by the normalization scalar value). The error-mitigated readout determination can be an estimated (e.g., an unbiased estimation of) or expected readout result (e.g., a readout result determined and generated by the quantum computer and processed by the RMC) that can have readout error desirably mitigated (e.g., reduced or minimized). At 828, the error-mitigated readout determination can be provided (e.g., communicated or produced) as an output (e.g., output from the RMC associated with the quantum computer).

For simplicity of explanation, the methods and/or computer-implemented methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 10:
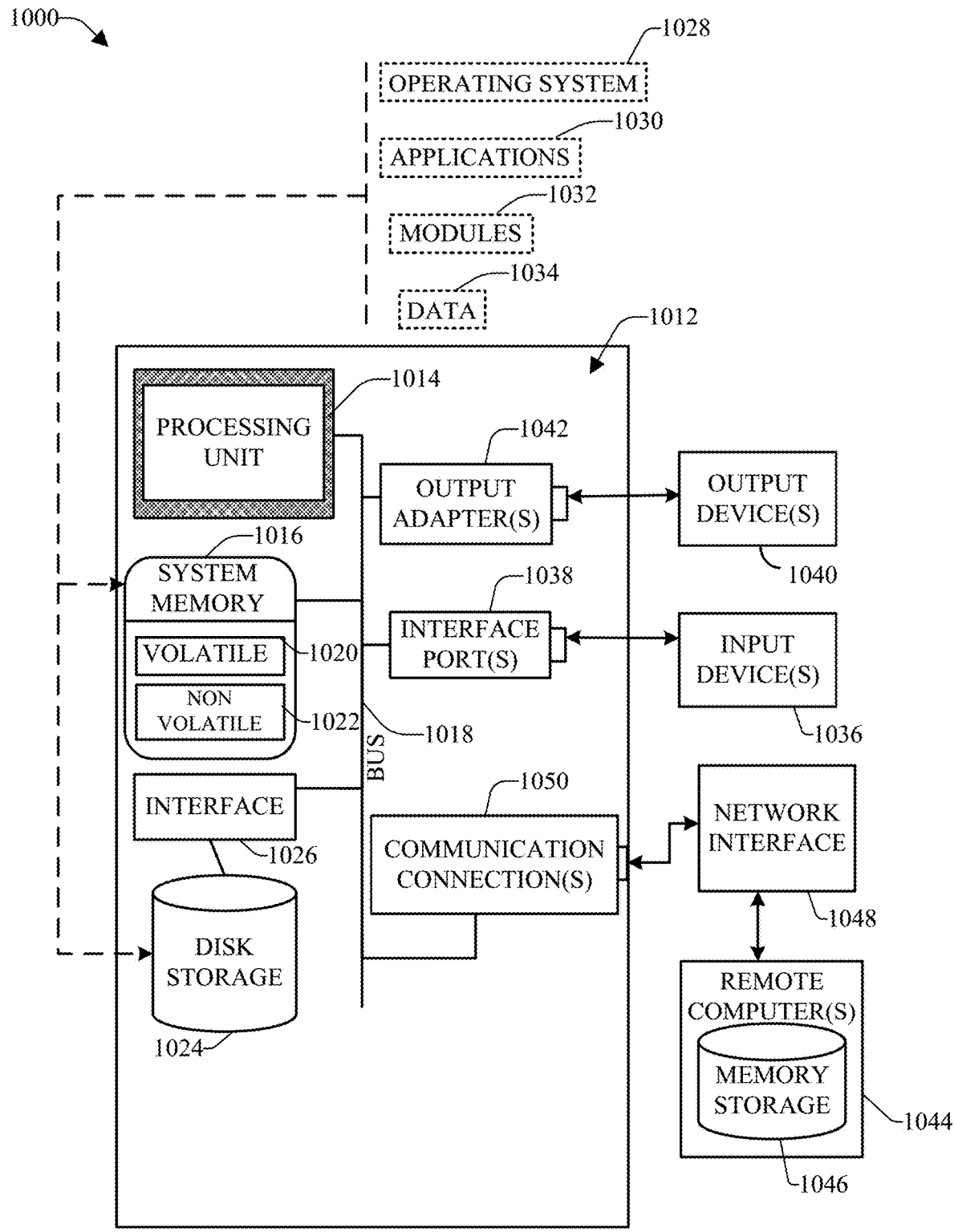
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is or may be omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 also can include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a method of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

One or more embodiments can be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer-executable components; and
a processor, operatively coupled to the memory, that executes at least one of the computer-executable components that:
generates a group of calibration circuits, wherein each calibration circuit comprises a group of qubits sequentially followed by a respective first subset of Pauli operators randomly selected for the calibration circuit from a set of Pauli operators, and wherein the respective first subset of Pauli operators are located at an output of the calibration circuit;
based on respective application of each calibration circuit of the group of calibration circuits on the group of qubits, measures respective calibration readout measurements of the group of qubits at the respective output of each calibration circuit;
subsequent to measuring the respective calibration readout measurements, generates a group of estimation circuits, wherein each estimation circuit comprises the group of qubits sequentially followed by a circuit of interest, and the circuit of interest sequentially followed by a respective second subset of Pauli operators randomly selected for the estimation circuit from the set of Pauli operators, and wherein the respective second subset of Pauli operators are distinct from the circuit of interest and are located at an output of the estimation circuit;
based on respective application of each estimation circuit of the group of estimation circuits on the group of qubits, measures respective estimation readout measurements of the group of qubits at the respective output of each estimation circuit; and generates an error-mitigated readout result associated with the circuit of interest based on a defined function of the respective calibration readout measurements and the respective estimation readout measurements.

2. The system of claim 1, wherein an amount of error associated with the error-mitigated readout result that is mitigated is based on the respective first subsets of Pauli operators and the respective second subsets of Pauli operators.

3. The system of claim 1, wherein the generating the error-mitigated readout result comprises generating calibration data based on the respective calibration readout measurements and a first defined function.

4. The system of claim 3, wherein the generating the error-mitigated readout result further comprises generating estimation data based on the respective estimation readout measurements and the first defined function.

5. The system of claim 4, wherein the generating the error-mitigated readout result further comprises:
generating a normalization scalar value based on the calibration data and a second defined function;
generating an estimation scalar value based on the estimation data and the second defined function; and
generating the error-mitigated readout result based on the normalization scalar value and the estimation scalar value.

6. The system of claim 4, wherein the at least one of the computer-executable components further:
updates the calibration data based upon generating one or more new calibration circuits.

7. The system of claim 4, wherein the generating the error-mitigated readout result further comprises:
generating a quantum noise model that models quantum noise as a classical noise channel based on the calibration data and the estimation data.

8. A computer-implemented method, comprising:
generating, by a system operatively coupled to a processor, a group of calibration circuits, wherein each calibration circuit comprises a group of qubits sequentially followed by a respective first subset of Pauli operators randomly selected for the calibration circuit from a set of Pauli operators, and wherein the respective first subset of Pauli operators are located at an output of the calibration circuit;
based on respective application of each calibration circuit of the group of calibration circuits on the group of qubits, measuring, by the system, respective calibration readout measurements of the group of qubits at the respective output of each calibration circuit;
subsequent to measuring the respective calibration readout measurements, generating, by the system, a group of estimation circuits, wherein each estimation circuit comprises the group of qubits sequentially followed by a circuit of interest, and the circuit of interest sequentially followed by a respective second subset of Pauli operators randomly selected for the estimation circuit from the set of Pauli operators, and wherein the respective second subset of Pauli operators are distinct from the circuit of interest and are located at an output of the estimation circuit;
based on respective application of each estimation circuit of the group of estimation circuits on the group of qubits, measuring, by the system, respective estimation readout measurements of the group of qubits at the respective output of each estimation circuit; and generating, by the system, an error-mitigated readout result associated with the circuit of interest based on a defined function of the respective calibration readout measurements and the respective estimation readout measurements.

9. The computer-implemented method of claim 8, wherein an amount of error associated with the error-mitigated readout result that is mitigated is based on the respective first subsets of Pauli operators and the respective second subsets of Pauli operators.

10. The computer-implemented method of claim 8, wherein the generating the error-mitigated readout result further comprises generating calibration data based on the respective calibration readout measurements and a first defined function.

11. The computer-implemented method of claim 10, wherein the generating the error-mitigated readout result further comprises generating estimation data based on the respective estimation readout measurements and the first defined function.

12. The computer-implemented method of claim 11, wherein the generating the error-mitigated readout result further comprises:
generating a normalization scalar value based on the calibration data and a second defined function;
generating an estimation scalar value based on the estimation data and the second defined function; and
generating the error-mitigated readout result based on the normalization scalar value and the estimation scalar value.

13. The computer-implemented method of claim 11, further comprising:
updating, by the system, the calibration data based on generating one or more new calibration circuits.

14. A computer program product that facilitates mitigating readout error associated with quantum circuitry, the computer program product comprising a non-transitory computer readable medium having program instructions embodied therewith, the program instructions are executable by a processor to cause the processor to:
generate a group of calibration circuits, wherein each calibration circuit comprises a group of qubits sequentially followed by a respective first subset of Pauli operators randomly selected for the calibration circuit from a set of Pauli operators, and wherein the respective first subset of Pauli operations are located at an output of the calibration circuit;
based on respective application of each calibration circuit of the group of calibration circuits on the group of qubits, measure respective calibration readout measurements of the group of qubits at the respective output of each calibration circuit;
subsequent to measuring the respective calibration readout measurements, generate a group of estimation circuits, wherein each estimation circuit comprises the group of qubits sequentially followed by a circuit of interest, and the circuit of interest sequentially followed by a respective second subset of Pauli operators randomly selected for the estimation circuit from the set of Pauli operators, and wherein the respective second subset of Pauli operators are distinct from the circuit of interest and are located at an output of the estimation circuit;
based on respective application of each estimation circuit of the group of estimation circuits on the group of qubits, measure respective estimation readout measurements of the group of qubits at the respective output of each estimation circuit; and generate an error-mitigated readout result associated with the circuit of interest based on a defined function of the respective calibration readout measurements and the respective estimation readout measurements.

15. The computer program product of claim 14, wherein the generating the error-mitigated readout result further comprises:

generating calibration data based on the respective calibration readout measurements and a first defined function;

generating estimation data based on the respective estimation readout measurements and the first defined function;

generating a normalization scalar value based on the calibration data and a second defined function;

generating an estimation scalar value based on the estimation data and the second defined function; and generating the error-mitigated readout result based on the normalization scalar value and the estimation scalar value.

16. A system, comprising:

a memory that stores computer-executable components; and a processor, operatively coupled to the memory, that executes at least one of the computer-executable components that:

generates a group of calibration circuits, comprises a group of qubits sequentially followed by a respective first subset of Pauli operators randomly selected for the calibration circuit from a set of Pauli operators, and wherein the respective first subset of Pauli operators are located at an output of the calibration circuit based on respective application of each calibration circuit of the group of calibration circuits on the group of qubits, measures respective calibration readout measurements of the group of qubits at the respective output of each calibration circuit generates a group of estimation circuits, wherein each estimation circuit is comprises the group of qubits sequentially followed by a respective second subset of Pauli operators randomly selected for the estimation circuit from the set of Pauli operators, the respective second subset sequentially followed by a circuit of interest, and the circuit of interest sequentially followed by a respective third subset of Pauli operators randomly selected for the estimation circuit from the set of Pauli operators, wherein the respective second subset of Pauli operators are distinct from the circuit of interest, and wherein the respective third subset of Pauli operators are distinct from the circuit of interest and are located at an output of the estimation circuit;

based on respective application of each estimation circuit of the group of estimation circuits on the group of qubits, measures respective estimation readout measurements of the group of qubits at the respective output of each estimation circuit; and generates an error-mitigated readout result associated with the circuit of interest based on a defined function of the respective calibration readout measurements and the respective estimation readout measurements.

17. The system of claim 16, wherein the generating the error-mitigated readout result comprises generating calibration data based on the respective calibration readout measurements and a first defined function.

18. The system of claim 17, wherein the generating the error-mitigated readout result further comprises generating estimation data based on the respective estimation readout measurements and the first defined function.

19. The system of claim 18, wherein the generating the error-mitigated readout result further comprises:

generating a normalization scalar value based on the calibration data and a second defined function;

generating an estimation scalar value based on the estimation data and the second defined function; and generating the error-mitigated readout result based on the normalization scalar value and the estimation scalar value.

20. The system of claim 18, wherein the generating the error-mitigated readout result further comprises:

generating a quantum noise model that models quantum noise as a classical noise channel based on the calibration data and the estimation data.

21. The system of claim 16, wherein the at least one of the computer-executable components further:

updates the calibration data based upon generating one or more new calibration circuits.

22. A computer-implemented method, comprising:

generating, by a system operatively coupled to a processor, a group of calibration circuits, comprises a group of qubits sequentially followed by a respective first subset of Pauli operators randomly selected for the calibration circuit from a set of Pauli operators, and wherein the respective first subset of Pauli operators are located at an output of the calibration circuit; and based on respective application of each calibration circuit of the group of calibration circuits on the group of qubits, measuring, by the system, respective calibration readout measurements of the group of qubits at the respective output of each calibration circuit;

generating, by the system, a group of estimation circuits, wherein each estimation circuit is comprises the group of qubits sequentially followed by a respective second subset of Pauli operators randomly selected for the estimation circuit from the set of Pauli operators, the respective second subset sequentially followed by a circuit of interest, and the circuit of interest sequentially followed by a respective third subset of Pauli operators randomly selected for the estimation circuit from the set of Pauli operators, and wherein the respective second subset of Pauli operators are distinct from the circuit of interest, and wherein the respective third subset of Pauli operators are distinct from the circuit of interest and are located at an output of the estimation circuit;

based on respective application of each estimation circuit of the group of estimation circuits on the group of qubits, measuring, by the system, respective estimation readout measurements of the group of qubits at the respective output of each estimation circuit; and generating, by the system, an error-mitigated readout result associated with the circuit of interest based on the respective calibration readout measurements and the respective estimation readout measurements.

23. The computer-implemented method of claim 22, wherein the generating the error-mitigated readout result further comprises:

generating calibration data based on the respective calibration readout measurements and a first defined function; and generating estimation data based on the respective estimation readout measurements and the first defined function.

24. The computer-implemented method of claim 23, wherein the generating the error-mitigated readout result further comprises:

generating a normalization scalar value based on the calibration data and a second defined function;

generating an estimation scalar value based on the estimation data and the second defined function; and generating, by the system, the error-mitigated readout result based on the normalization scalar value and the estimation scalar value.

25. The computer-implemented method of claim 23, wherein the generating the error-mitigated readout result further comprises:

generating a quantum noise model that models quantum noise as a classical noise channel based on the calibration data and the estimation data.

* * * * *